United States Patent
Wakai et al.

(10) Patent No.: US 11,781,856 B2
(45) Date of Patent: Oct. 10, 2023

(54) IMAGE DIMENSION MEASUREMENT DEVICE

(71) Applicant: Keyence Corporation, Osaka (JP)

(72) Inventors: Tatsuro Wakai, Osaka (JP); Atsushi Matsutani, Osaka (JP)

(73) Assignee: KEYENCE CORPORATION, Osaka (JP)

(*) Notice: Subject to any disclaimer, the term of this patent is extended or adjusted under 35 U.S.C. 154(b) by 248 days.

(21) Appl. No.: 17/241,267

(22) Filed: Apr. 27, 2021

(65) Prior Publication Data
US 2021/0372783 A1   Dec. 2, 2021

(30) Foreign Application Priority Data
May 29, 2020 (JP) ................. 2020-094236

(51) Int. Cl.
*G01B 11/02* (2006.01)
*G01B 11/26* (2006.01)
*G06T 7/00* (2017.01)
*G06T 7/73* (2017.01)

(52) U.S. Cl.
CPC .......... *G01B 11/02* (2013.01); *G01B 11/26* (2013.01); *G06T 7/001* (2013.01); *G06T 7/74* (2017.01)

(58) Field of Classification Search
CPC  G01B 11/02; G01B 11/26; G06T 7/74; G06T 7/001
See application file for complete search history.

(56) References Cited

U.S. PATENT DOCUMENTS

| | | | | |
|---|---|---|---|---|
| 2013/0208286 A1* | 8/2013 | Kurahashi | ............ | B23Q 17/249 356/601 |
| 2017/0022104 A1* | 1/2017 | Eversole | ................. | B28B 5/027 |

FOREIGN PATENT DOCUMENTS

| | | | | | |
|---|---|---|---|---|---|
| CN | 113124763 | A | * | 7/2021 | ............ G01B 11/02 |
| JP | 3602199 | B2 | * | 12/2004 | ............ B23Q 17/20 |
| JP | 2006284531 | A | * | 10/2006 | |
| JP | 2006284531 | A | | 10/2006 | |
| JP | 2010169584 | A | | 8/2010 | |

\* cited by examiner

*Primary Examiner* — Pinalben Patel
(74) *Attorney, Agent, or Firm* — Kilyk & Bowersox, P.L.L.C.

(57) ABSTRACT

Convenience is improved by enabling an imaging section to capture an image of a measurement element without adjustment of a rotation angle of a measurement object performed by a user. A control unit identifies a reference rotation angle during measurement, and calculates a measurement angle to measure a measurement element based on a relative rotation angle with respect to the reference rotation angle stored in advance. The control unit controls a rotation unit such that a rotation angle of the rotation unit becomes the measurement angle. The control unit executes a process of measuring a dimension of the measurement element based on a measurement object image captured by an imaging section when the rotation angle of the rotation unit becomes the measurement angle.

7 Claims, 29 Drawing Sheets

LEFT SIDE ← → RIGHT SIDE

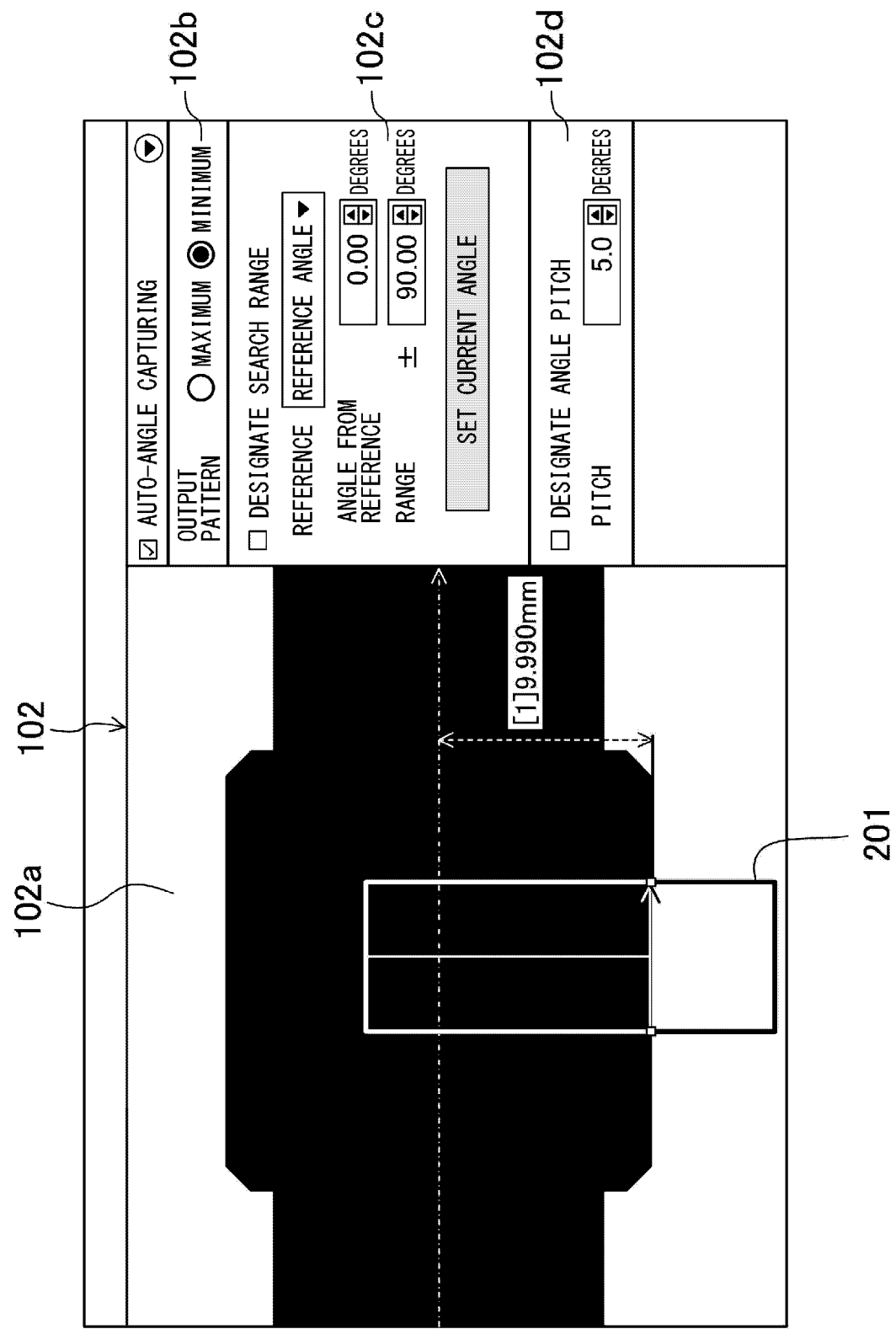

FIG. 16

| CHARACTERISTIC SHAPE | MEASUREMENT ELEMENT | REFERENCE |
|---|---|---|
| THROUGH HOLE | LINE-POINT DISTANCE IS MINIMUM | CENTRAL AXIS + MINIMUM POINT |
| BLIND HOLE | LINE-POINT DISTANCE IS MINIMUM | CENTRAL AXIS + MINIMUM POINT |
| D-CUT | LINE-LINE DISTANCE IS MINIMUM | CENTRAL AXIS + STRAIGHT LINE |
| THROUGH KEY GROOVE | LINE-POINT DISTANCE IS MINIMUM | CENTRAL AXIS + MINIMUM POINT |
| THROUGH KEY GROOVE | LINE-LINE DISTANCE IS MINIMUM | STRAIGHT LINE + STRAIGHT LINE |
| BLIND KEY GROOVE | LINE-POINT DISTANCE IS MINIMUM | CENTRAL AXIS + MINIMUM POINT |
| OUTER DIAMETER MAXIMUM | LINE-POINT DISTANCE IS MAXIMUM | CENTRAL AXIS + MAXIMUM POINT |
| OUTER DIAMETER MINIMUM | LINE-POINT DISTANCE IS MINIMUM | CENTRAL AXIS + MINIMUM POINT |
| PIN | LINE-POINT DISTANCE IS EXTREMELY SHORT | CENTRAL AXIS + MAXIMUM POINT |

FIG. 17

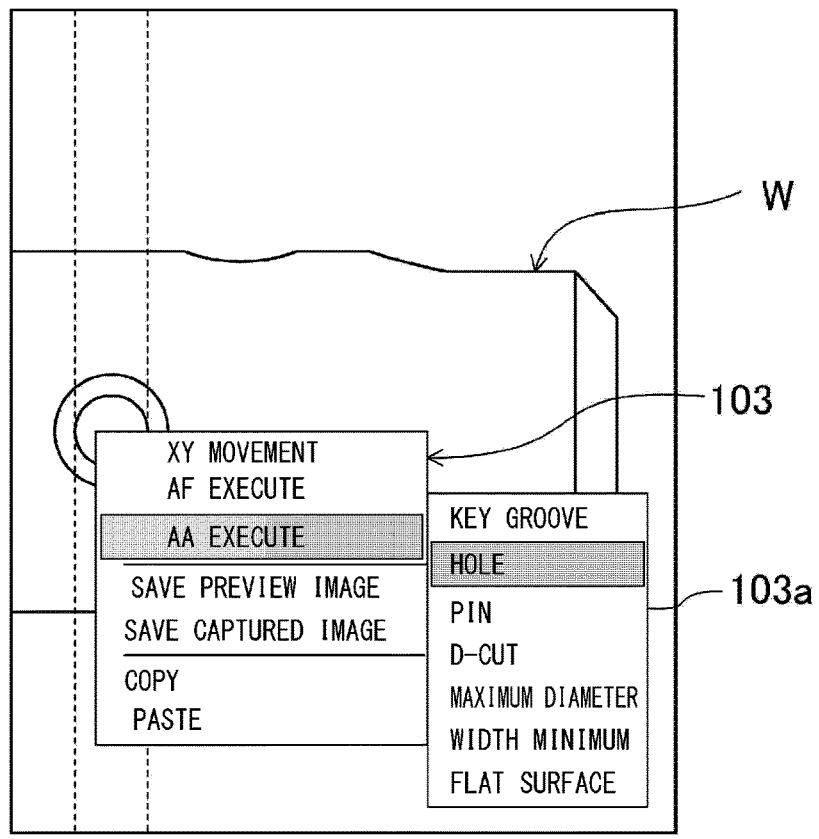

ANGLE AT WHICH DIALOG IS CLOSED IS 0 DEGREES

ELEMENT USED TO DETECT DIRECTION OF MEASUREMENT OBJECT IS 90 DEGREES

ANGLE AT WHICH DIALOG IS CLOSED IS 0 DEGREES

ELEMENT USED TO DETECT DIRECTION OF MEASUREMENT OBJECT IS 180 DEGREES

IMAGE DIMENSION MEASUREMENT DEVICE

CROSS-REFERENCE TO RELATED APPLICATIONS

The present application claims foreign priority based on Japanese Patent Application No. 2020-094236, filed May 29, 2020, the contents of which are incorporated herein by reference.

BACKGROUND OF THE INVENTION

1. Field of the Invention

The present invention relates to an image dimension measurement device provided with a rotation mechanism that rotates a measurement object.

2. Description of Related Art

Conventionally, image dimension measurement devices are configured to be capable of measuring a dimension of each part of a measurement object based on an image obtained by capturing a measurement object placed on a stage. For example, in a device disclosed in JP 2010-199584 A, any partial image of a measurement object is registered in advance as a feature image at the time of setting, and pattern search is performed using the feature image on an image newly acquired during operation, so that it is possible to detect a position and an attitude of the measurement object. As a result, it is possible to measure dimensions of measurement elements such as a line segment, a circle, and an arc regardless of the position and attitude of the measurement object on the stage.

Further, JP 2006-284531 A discloses a device that captures an image of a processing tool fixed to a spindle of a machining center from the side with a camera, performs image processing on the image captured by the camera to extract a contour line image, and calculates a dimension of a processing tool from the contour line image.

By the way, an image dimension measurement device as in JP 2010-199584 A is provided with a rotation mechanism that rotates the measurement object.

As a result, the dimensions of the measurement elements can be measured by rotating the measurement object, which improves convenience.

However, for example, when a measurement object is a cylindrical member and measurement is performed for measurement elements, such as a D-cut surface having a flat surface formed on a part of the outer peripheral surface of the member and a hole formed in the member, it is necessary to capture images of these measurement elements by an imaging section, and thus, there is a problem that it is necessary to adjust a rotation angle of the measurement object with respect to the imaging section such that the measurement elements can be captured by the imaging section, which takes time and effort for a user.

SUMMARY OF THE INVENTION

The present disclosure has been made in view of this point, and an object thereof is to improve convenience by enabling an imaging section to capture an image of a measurement element without adjustment of a rotation angle of a measurement object performed by a user.

In order to achieve the above object, according to one embodiment of the invention, an image dimension measurement device that measures a dimension of a measurement object can be assumed. The image dimension measurement device includes: a rotation mechanism that rotates the measurement object about a predetermined axis; an imaging section that has an optical axis intersecting a rotation axis of the rotation mechanism and is configured to generate a plurality of measurement object images obtained by capturing images of the measurement object at different rotation angles; an operation section configured to receive setting of a reference shape on a first measurement object image generated by the imaging section and to set a measurement element on a second measurement object image captured at a different rotation angle from the first measurement object image; a storage section that stores a relative rotation angle when the second measurement object image is captured with respect to a reference rotation angle when the first measurement object image is captured; and a control section that identifies the reference rotation angle from the plurality of measurement object images based on the setting of the reference shape received by the operation section during measurement, calculates a measurement angle to measure the measurement element set by the operation section based on the relative rotation angle with respect to the reference rotation angle stored in the storage section, controls the rotation mechanism such that a rotation angle of the rotation mechanism becomes the measurement angle, and executes a measurement process of measuring a dimension of a measurement element set by the operation section based on a measurement object image captured by the imaging section when the rotation angle of the rotation mechanism becomes the measurement angle.

According to this configuration, the imaging section can generate the first measurement object image and the second measurement object image at the time of setting the image dimension measurement device. These first and second measurement object images are images obtained by capturing images of the measurement object at different rotation angles. When the user sets the reference shape on the first measurement object image, the information thereof is received by the operation section. Further, when the measurement element, such as a line segment, a circle, and an arc, is set on the second measurement object image, the measurement element is set. Further, the relative rotation angle when the second measurement object image is captured with respect to the reference rotation angle when the first measurement object image is captured is stored and held in the storage section.

When the image dimension measurement device is operated, that is, when the measurement object is continuously measured, the imaging section generates a plurality of measurement object images in which the measurement object is captured at different rotation angles. The control section identifies the reference rotation angle from the plurality of measurement object images based on the reference shape set by the operation section. The relative rotation angle with respect to the reference rotation angle can be read from the storage section. When the measurement angle to measure the measurement element is calculated based on the relative rotation angle, the control section controls the rotation mechanism so as to have the calculated measurement angle. As a result, the rotation angle of the rotation mechanism automatically becomes the measurement angle, so that the measurement element is arranged at a position where the imaging section can capture an image. Therefore, the rotation angle of the measurement object is automatically adjusted, so that the user does not need to adjust the rotation angle of the measurement object.

When the rotation angle of the rotation mechanism becomes the measurement angle, the imaging section capture the image of the measurement object, and the control section executes the process of measuring the dimension of the measurement element based on the measurement object image generated in this manner, so that the dimension of the measurement element can be acquired.

The reference rotation angle may be an angle itself identified based on the reference shape, or may be a designated angle offset from that angle.

Further, the rotation angle of the measurement object may be manually adjustable by the user. In this case, the automatic adjustment and manual adjustment are used together.

Further, for example, when a certain characteristic shape is input as the reference shape on the first measurement object image, the characteristic shape is set. An input form may be, for example, a form in which one is selected from a plurality of candidates. When the reference shape is input, the control section can accurately identify the reference rotation angle by detecting the reference shape received by the operation section from the plurality of measurement object images generated by the imaging section.

For example, when the measurement object is a cylindrical member, examples of the reference shape can include a D-cut surface having a flat surface formed on a part of an outer peripheral surface of the member, a hole formed in the member, a pin protruding in the radial direction from the member, a key groove shape, and the like, but are not limited thereto.

According to another embodiment of the invention, the control section can calculate a rotation angle at which the reference shape faces the imaging section based on the plurality of measurement object images captured by the imaging section and a rotation angle of the rotation mechanism when each of the measurement object images is captured, and control the rotation mechanism such that the reference shape faces the imaging section.

According to this configuration, the rotation mechanism is controlled such that the reference shape has the rotation angle facing the imaging section, and thus, it is possible to capture the image of the measurement object in the state where the reference shape faces the imaging section. As a result, the measurement accuracy is improved.

According to still another embodiment of the invention, the image dimension measurement device includes a display section that displays each of rotation angles and the second measurement object image captured at each of the rotation angles in association with each other, and an angle corresponding to the second measurement object image on which the measurement element is set in an identifiable manner. The operation section is configured such that the rotation angle is selectable on the display section. The control section can control the rotation mechanism so as to have the rotation angle selected by the operation section.

According to this configuration, when the user selects a rotation angle on the display section, the rotation mechanism is controlled so as to have the selected rotation angle. Thus, the second measurement object image captured at the rotation angle can be displayed on the display section in association with the rotation angle.

According to still another embodiment of the invention, the operation is configured to be capable of registering a pattern image of an arbitrary part of the measurement object on a measurement object image and position information of the pattern image, and the control section includes a pattern search execution section that executes pattern search to search for the pattern image registered by the operation section using the measurement object image captured by the imaging section during measurement, and can execute position correction of the measurement object image in an X direction and a Y direction based on an execution result of the pattern search in the pattern search execution section and the position information registered in the operation section.

According to this configuration, any part of the measurement object image can be registered as the pattern image, which is a search target, on the measurement object image at the time of setting. During the measurement, the pattern search execution section searches for the pattern image with the measurement object image captured by the imaging section. As a result of the search, it is considered that the measurement object image deviates in the horizontal direction (X direction) or the vertical direction (Y direction) in the image. For example, when the image deviates in the X direction, a position of the measurement object image can be corrected in the X direction based on the registered position information. Further, when the image deviates in the Y direction, the position of the measurement object image can be similarly corrected in the Y direction.

According to still another embodiment of the invention, the pattern search execution section can execute the pattern search using a plurality of measurement object images obtained by capturing images of the measurement object at different rotation angles by the imaging section during measurement, and identify a rotation angle at which a highest degree of coincidence with the registered pattern image is obtained, and the control section can use the rotation angle identified by the pattern search execution section as a reference angle.

According to this configuration, the pattern image is searched for each of the plurality of measurement object images obtained by capturing of images of the measurement object at different rotation angles, so that it is possible to identify the rotation angle at which the highest degree of coincidence with the pattern image is obtained. The measurement element can be measured by controlling the rotation mechanism with this rotation angle as the reference angle.

According to still another embodiment of the invention, the operation section can be configured to be capable of setting a search angle range in which the pattern search execution section executes the pattern search.

For example, when there is an angle range that is known to have a significantly low degree of coincidence with the pattern image, the processing time of the pattern search can be shortened as the user sets the search angle range of the pattern search so as to exclude the angle range. Further, when patterns on the front and back of the measurement object are the same, the user can also set the search angle range of the pattern search so as to exclude one of the patterns.

According to still another embodiment of the invention, the operation section can be configured to be capable of receiving designation of an area to be registered in the pattern image on the measurement object image.

According to this configuration, the user can arbitrarily set the area to be registered in the pattern image. For example, when there is a measurement object whose shape does not change on the measurement object image even if being rotated, the processing time of the pattern search can be shortened during the measurement since a part whose shape does not change is registered as the pattern image.

According to the present disclosure, the rotation angle of the rotation mechanism that rotates the measurement object automatically becomes the measurement angle, and thus, it is possible to improve the convenience by enabling the imaging section to capture the image of the measurement element without the adjustment of the rotation angle of the measurement object performed by the user.

BRIEF DESCRIPTION OF THE DRAWINGS

FIG. 15 is a view illustrating an example of a parameter setting user interface screen;

FIG. 16 is a view illustrating an example of a preset shape, a measurement content, and a maximum/minimum combination;

FIG. 17 is a view illustrating an example in which a window for executing an auto-angle function is displayed during editing;

DETAILED DESCRIPTION OF PREFERRED EMBODIMENTS

Hereinafter, an embodiment of the present aspect will be described in detail with reference to the drawings. Note that the following description of the preferred embodiment is merely an example in essence, and is not intended to limit the present aspect, its application, or its use.

Figure 1:
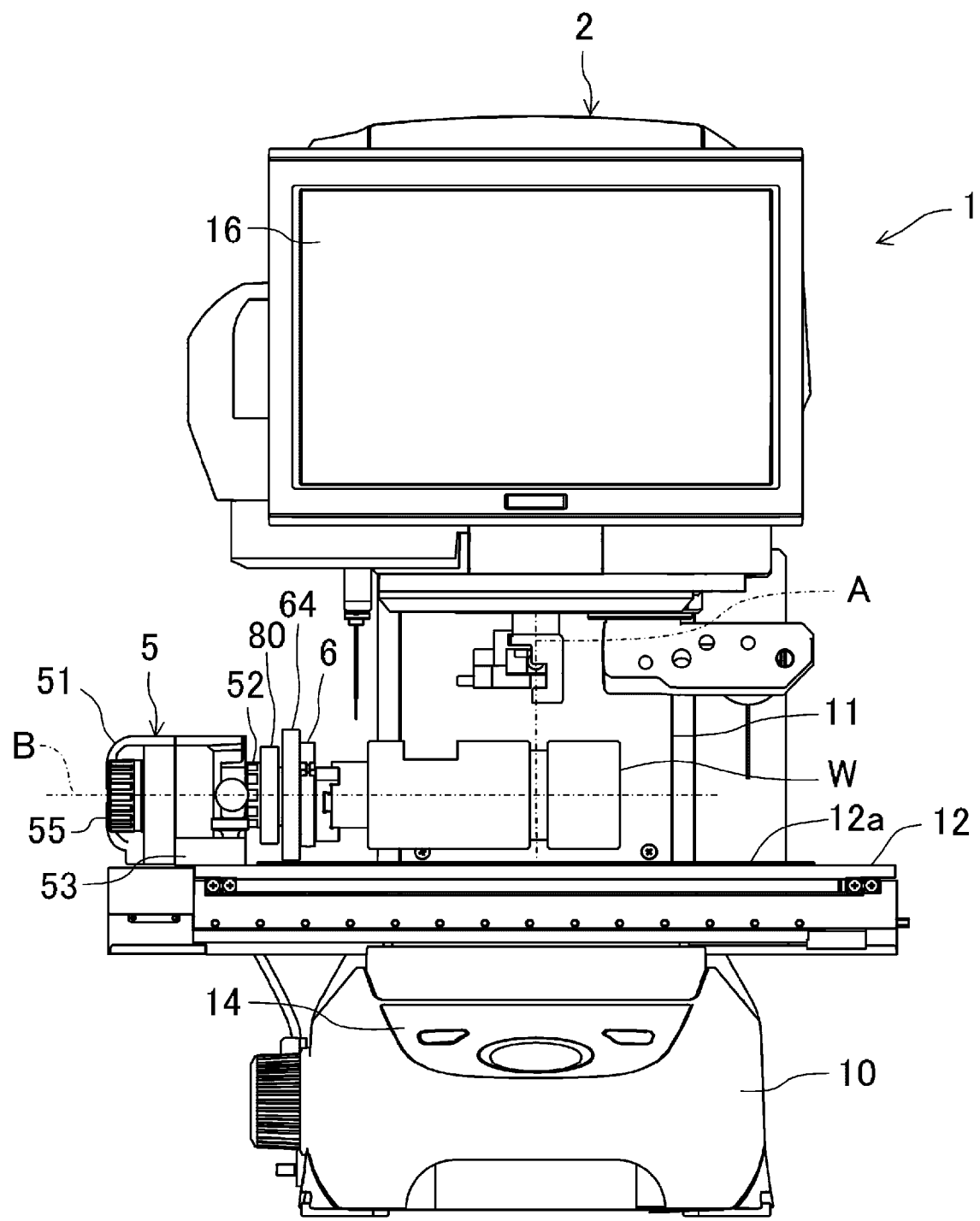
FIG. 1 is a front view of an image dimension measurement device according to the present embodiment.
Figure 2:
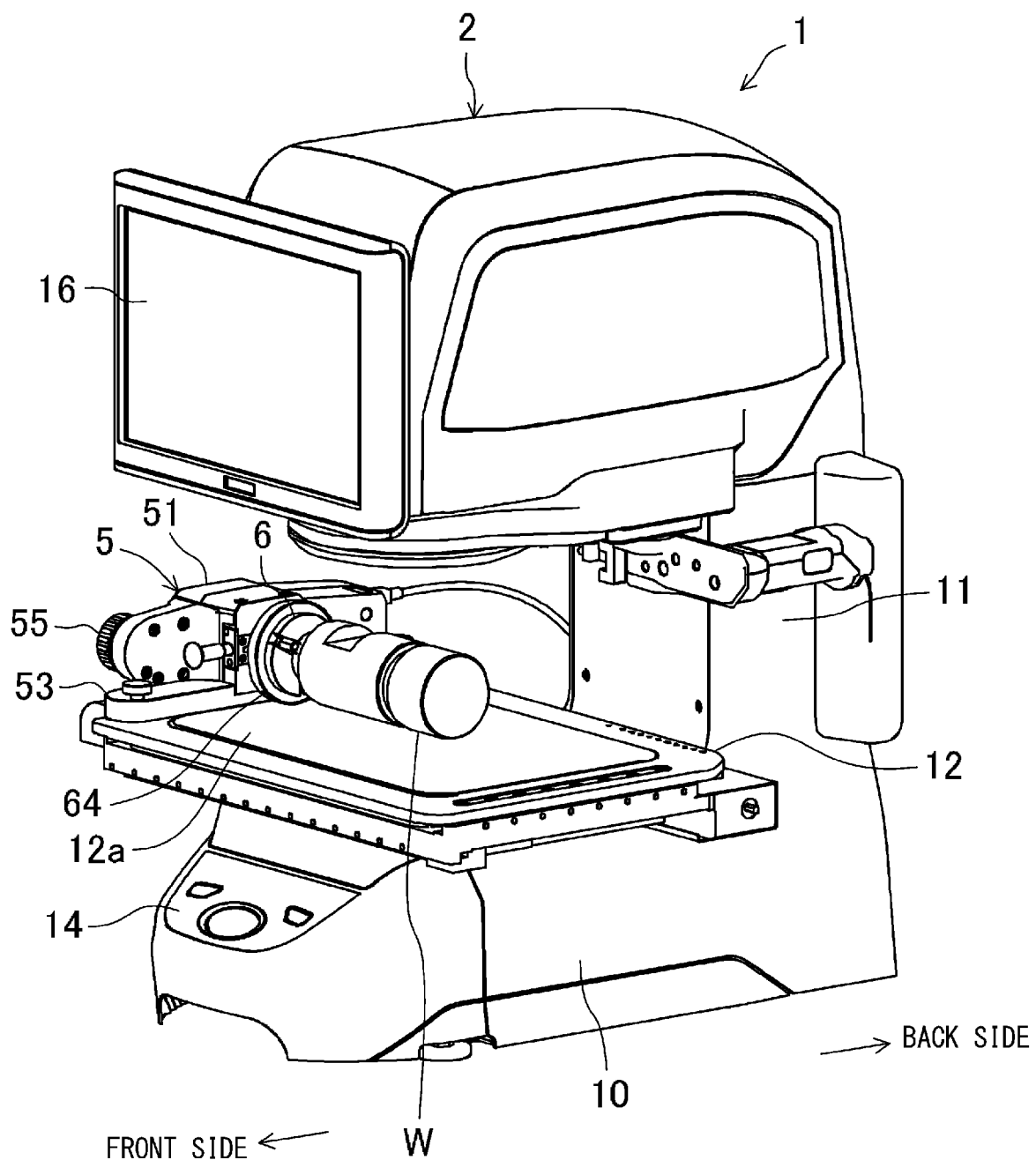
FIG. 2 is a perspective view of the image dimension measurement device.
Figure 3:
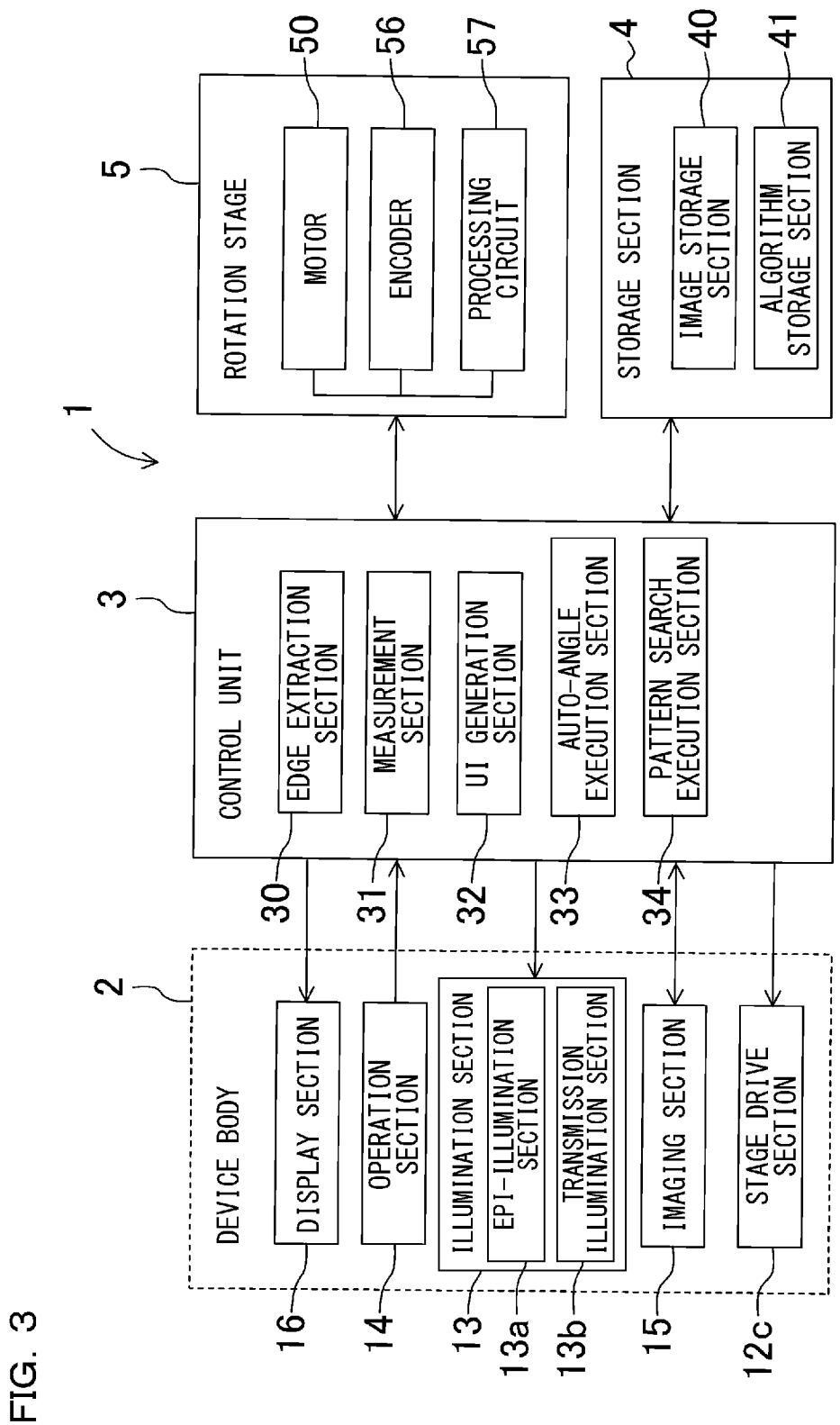
FIG. 3 is a block diagram of the image dimension measurement device.

FIG. 1 is a front view of an image dimension measurement device 1 according to the embodiment of the invention, and FIG. 2 is a perspective view of the image dimension measurement device 1 according to the embodiment of the invention. Further, FIG. 3 is a block diagram schematically illustrating a configuration of the image dimension measurement device 1 according to the embodiment of the invention. The image dimension measurement device 1 measures a dimension of a measurement object W (illustrated in FIGS. 1 and 2) such as various workpieces, and includes a device body 2, a control unit 3, a storage section 4, and a rotation unit 5 as illustrated in FIG. 3. The control unit 3 may be configured as a separate body and connected to the device body 2 to be capable of communicating via a communication line or the like, or may be incorporated and integrated inside the device body 2. Similarly, the storage section 4 may be configured as a separate body from the device body 2, or may be incorporated and integrated inside the device body 2. In this example, the control unit 3 and the storage section 4 are configured as separate bodies, but these may be integrated.

Note that, in the description of the present embodiment, a side located in front of the image dimension measurement device 1 when viewed from a user is referred to as a front side, a side located on the back is referred to as a back side, a side located on the left is referred to as a left side, and a side located on the right is referred to as a right side. The front side can be referred to as the near side, and the back side can also be referred to as the far side. This is only defined for convenience of the description.

(Configurations of Device Body 2 and Control Unit 3)

As illustrated in FIGS. 1 and 2, the device body 2 includes a base section 10 and an arm section 11 extending upward from the back side of the base section 10. A stage 12 configured to arrange the measurement object W is provided above the base section 10. The stage 12 extends almost horizontally. A transmitting section 12a that transmits light is provided near the central portion of the stage 12. The stage 12 can be driven by a stage drive section 12c illustrated in FIG. 3.

As illustrated in FIG. 3, the device body 2 is provided with an illumination section 13. The illumination section 13 includes an epi-illumination section 13a built in the arm section 11 and a transmission illumination section 13b built in the base section 10. The epi-illumination section 13a is an illumination device that illuminates the measurement object W placed (standing) on the stage 12 or the measurement object W rotatable by the rotation unit 5 from above, and can be formed in a ring shape surrounding an optical axis A (illustrated in FIG. 1) of the imaging section 15 to be described later. The transmission illumination section 13b is an illumination device that illuminates the measurement object W placed on the transmitting section 12a of the stage 12 or the measurement object W rotatable by the rotation unit 5 from below. FIGS. 1 and 2 illustrates only the measurement object W that is rotatable by the rotation unit 5.

An operation section 14 is provided on the front side of the base section 10. The operation section 14 includes various buttons, switches, dials, and the like operated by the user. The operation section 14 is connected to the control unit 3, and the control unit 3 detects an operation state of the operation section 14 and controls each section according to the operation state of the operation section 14. The operation section 14 may be configured using a touch panel or the like that can detect the user's touch operation. In this case, the operation section 14 can be incorporated in a display section 16 to be described later. Further, the operation section 14 may be configured using a keyboard, a mouse, or the like that can be connected to the control unit 3.

The epi-illumination section 13a and the transmission illumination section 13b are connected to the control unit 3 and controlled by the control unit 3. For example, when the control unit 3 detects that the operation section 14 has performed a measurement start operation on the measurement object W, the epi-illumination section 13a or the transmission illumination section 13b can be turned on to emit light.

The arm section 11 is provided with the imaging section 15 (illustrated in FIG. 3). The imaging section 15 is a part configured to capture an image of the measurement object W placed on the stage 12 or the measurement object W rotatable by the rotation unit 5 and generate a measurement object image. Examples of the imaging section 15 can include a camera having an imaging element such as a charge coupled device (CCD) and a complementary metal oxide semiconductor (CMOS). As illustrated in FIG. 1, the optical axis A of the imaging section 15 is set vertically downward. Although not illustrated, an optical system including a light receiving lens and an imaging lens is provided coaxially with the optical axis A of the imaging section 15. The imaging section 15 may be an imaging unit including the optical system, or does not necessarily include the optical system. The light emitted from the epi-illumination section 13a and reflected by the measurement object W, light emitted from the transmission illumination section 13b and transmitted through the transmitting section 12a of the stage 12, or the like is incident on the imaging section 15. Conventionally used methods can be applied to a method for focus adjustment by the optical system.

The imaging section 15 generates an image based on the amount of received light. The imaging section 15 is connected to the control unit 3, and the image generated by the imaging section 15 is transmitted to the control unit 3 as image data. Further, the control unit 3 can control the imaging section 15. For example, when the control unit 3 detects that the operation section 14 has performed the measurement start operation on the measurement object W, the imaging section 15 is made to execute imaging processing in the state where the epi-illumination section 13a or the transmission illumination section 13b can be turned on to emit light. As a result, the imaging section 15 generates the measurement object image, and the generated measurement object image is transmitted to the control unit 3.

In the control unit 3, the measurement object image transmitted from the imaging section 15 is incorporated into a user interface screen and displayed on the display section 16. That is, the display section 16 is provided above the arm section 11 so as to face the front. The display section 16 is configured using, for example, a liquid crystal display, an organic EL display, or the like, and is connected to the control unit 3. The control unit 3 controls the display section 16 to display various user interface screens on the display section 16.

The storage section 4 is connected to the control unit 3. The storage section 4 is configured using, for example, a solid state drive (SSD), a hard disk, or the like. The control unit 3 is a part that is connected to each hardware as described above, controls the operation of each hardware, and executes a software function according to a computer program stored in the storage section 4. Although not illustrated, the control unit 3 is provided with a RAM or the like, and a load module is developed when the computer program is executed, and temporary data or the like generated when the computer program is stored.

The control unit 3 is provided with an edge extraction section 30 and a measurement section 31. The edge extraction section 30 is a part that executes image processing on the measurement object image transmitted from the imaging section 15 to extract an edge (contour) of the measurement object W. Since a method for extracting an edge of the measurement object has been conventionally known, the detailed description thereof will be omitted. The edge extraction section 30 outputs an edge image illustrating the edge of the measurement object.

The edge image output from the edge extraction section 30 is input to the measurement section 31. The measurement section 31 measures a dimension of each section of the measurement object W using the edge image. A dimension measurement site can be designated in advance by the user. For example, when the user operates the operation section 14 while viewing the measurement object image displayed on the display section 16 and designates arbitrary two points on the measurement object image, a measurement site of the measurement object W can be identified based on position coordinates of the designated points. The measurement section 31 can acquire a dimension of a predetermined site by calculating a distance between edges, an edge length, and the like corresponding to the measurement site designated by the user. The acquired dimension can be displayed on the display section 16. At this time, a value indicating the dimension and a dimension line can be displayed to be superimposed on the measurement object image.

(Configuration for Rotating Measurement Object W)

In the present embodiment, not only the measured is performed by placing the measurement object W on the stage 12, but also the measurement can be also performed by rotating measurement object W. Specifically, the image dimension measurement device 1 includes the rotation unit (rotation mechanism) 5 that generates and outputs a rotational force, and a chuck mechanism 6 that grips the measurement object W as a configuration for rotating the measurement object W and an accompanying configuration thereof. Although details will be described later, the chuck mechanism 6 is configured to be attachable to and detachable from the rotation unit 5. When the chuck mechanism 6 is mounted on the rotation unit 5, the rotational force output from the rotation unit 5 is transmitted to the measurement object W via the chuck mechanism 6 to rotate the measurement object W. The rotation unit 5 can be stopped in a state where the measurement object W is rotated by a predetermined angle.

[Configuration of Rotation Unit 5]

As illustrated in FIG. 1, the rotation unit 5 is a stage configured to enable rotation about a predetermined rotation axis B in a state where the measurement object W is arranged above the transmitting section 12a of the stage 12 and stop the rotation at an arbitrary rotation position and maintaining such an attitude. In the present embodiment, the rotation unit 5 is configured as a separate body from the stage 12 and to be attachable to and detachable from the stage 12, but the rotation unit 5 and the stage 12 may be integrally configured. In the case of the attachable and detachable rotation unit 5, the rotation unit 5 can be attached to the stage 12 only when the rotation unit 5 is required, and can be removed from the stage 12 if unnecessary.

The rotation unit 5 includes a motor 50 (illustrated in FIG. 3), a housing 51 containing the motor 50 therein, and a rotating body 52 rotated by the motor 50. The motor 50 is fixed to the housing 51. The housing 51 is attached to a left end of the stage 12. Incidentally, the housing 51 may be attached to a right end of the stage 12, and the stage 12 illustrated in FIG. 1 or the like only has to be configured to be bisymmetrical in this case.

In a state where the housing 51 is attached to the stage 12, an output shaft of the motor 50 is arranged so as to extend horizontally toward the right side. The rotating body 52 is fixed to this output shaft, so that the rotating body 52 is rotated about the rotation axis B extending horizontally in the left-right direction. Since the optical axis A of the imaging section 15 extends in the vertical direction, the rotation axis B intersects the optical axis A of the imaging section 15. In the present embodiment, the rotation axis B is orthogonal to the optical axis A of the imaging section 15, but is not necessarily orthogonal thereto.

As illustrated in FIGS. 1 and 2, the chuck mechanism 6 is attached to the rotating body 52. Although the rotating body 52 is directly connected to the output shaft of the motor 50 in the present embodiment, but the invention is not limited thereto, and a reduction gear mechanism (not illustrated) may be provided between the motor 50 and the rotating body 52, for example. In this case, the rotating body 52 is connected to an output shaft of the reduction gear mechanism.

Figure 4:
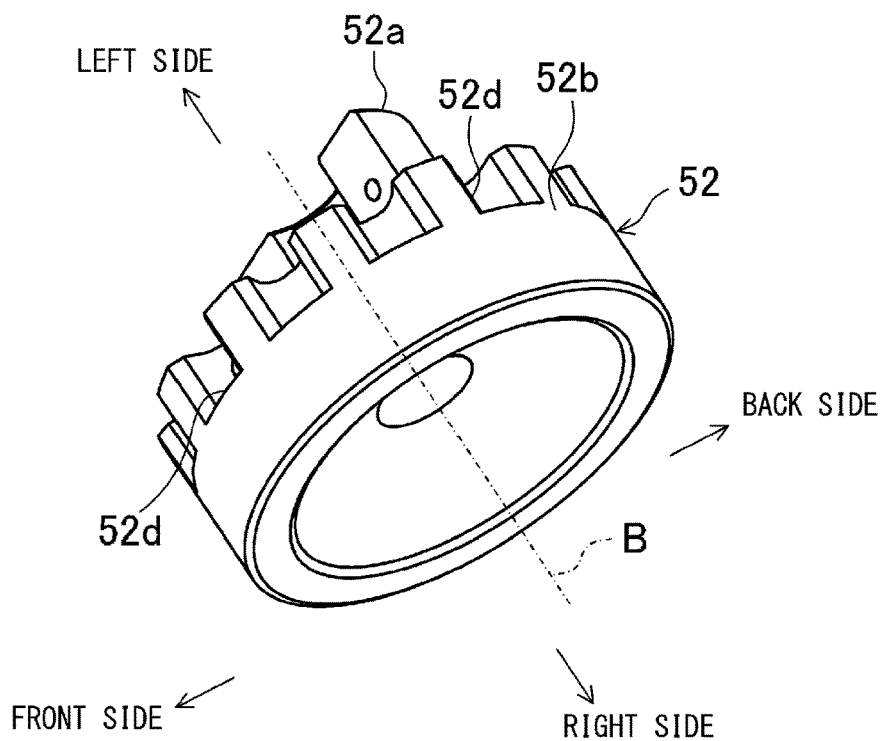
FIG. 4 is a perspective view illustrating the positional relationship between a rotating body and a locking mechanism.

As illustrated in FIG. 4, the rotating body 52 has an annular peripheral wall portion 52b that protrudes from a connecting portion 52a in the direction of the rotation axis B (right side) and extends in the circumferential direction of the rotation axis B. The connecting portion 52a and the peripheral wall portion 52b are integrated. An axis of the peripheral wall portion 52b is located on the rotation axis B. A screw thread is formed on an outer peripheral surface of the peripheral wall portion 52b.

A plurality of slits 52c extending from a distal end (right end) of the peripheral wall portion 52b in the protruding direction toward a proximal end side (left side) are formed in the peripheral wall portion 52b at intervals in the circumferential direction. A left end of the slit 52c is located in the middle portion in the left-right direction of the peripheral wall portion 52b. Since the plurality of slits 52c are formed, the width of each of the slits 52c is narrowed so that it becomes possible to reduce the diameter of the peripheral wall portion 52b when a fastening force from the outer side to the inner side in the radial direction is applied to the peripheral wall portion 52b. A deformation of the peripheral wall portion 52b at this time is a deformation in an elastic deformation area, and is restored to the original shape by removing the fastening force. The slits 52c can be formed at equal intervals in the circumferential direction of the peripheral wall portion 52b.

As illustrated in FIGS. 1 and 2, the rotation unit 5 includes a manual adjustment knob 55, an encoder 56 (illustrated in FIG. 3) that detects the amount of rotation of the manual adjustment knob 55, and a processing circuit 57 (illustrated in FIG. 3). The manual adjustment knob 55 is supported by the housing 51 to be rotatable about an axis parallel to the rotation axis B. The manual adjustment knob 55 is arranged at a position on the front side and the left side of the housing 51, and protrudes from the housing 51 toward the left side. As a result, the user can rotate the manual adjustment knob 55 with a left hand in the state of sitting in front of the image dimension measurement device 1. Incidentally, the arrangement position of the manual adjustment knob 55 is not particularly limited, and may be located on the back side or the left side of the housing 51.

The encoder 56 is built in the housing 51, and can be configured by a conventionally known rotary encoder or the like. For example, when the user rotates the manual adjustment knob 55, the amount of rotation can be detected by the encoder 56, and a result detected by the encoder 56 is output from the encoder 56 to the processing circuit 57 as a signal related to the amount of rotation.

The processing circuit 57 is a part that controls the motor 50, and may be built in the control unit 3 or built in the device body 2. The processing circuit 57 receives the signal related to the amount of rotation output from the encoder 56, converts the signal into the amount of rotation of the motor 50, and rotates the motor 50 by the converted rotation amount. The amount of rotation of the manual adjustment knob 55 and the amount of rotation of an output shaft 50a of the motor 50 do not necessarily coincide with each other, and may correspond to each other. For example, when the user rotates the manual adjustment knob 55 by 10°, the encoder 56 detects that the manual adjustment knob 55 has been rotated 10°, and outputs a detection signal according to the amount of rotation to the processing circuit 57. When the information that the manual adjustment knob 55 has been rotated by 10° is acquired by the processing circuit 57, the processing circuit 57 converts the amount of rotation of the manual adjustment knob 55 at a predetermined ratio and outputs a control signal to the motor 50. The control signal can be a signal that rotates the output shaft 50a of the motor 50 by less than 10°.

Since the control of the motor 50 by the processing circuit 57 is executed in almost real time, when the manual adjustment knob 55 starts to rotate, the motor 50 also rotates substantially synchronously. When the manual adjustment knob 55 stops, the motor 50 also stops substantially synchronously. As a result, the user can rotate the measurement object W by an arbitrary angle.

Since the rotating body 52 is directly driven by the motor 5 in this example, the processing circuit 57 may control the motor 50 such that the output shaft 50a of the motor 50 rotates by the amount of rotation of the manual adjustment knob 55. When the reduction gear mechanism is provided between the output shaft 50a of the motor 50 and the rotating body 52, the processing circuit 57 may rotate the output shaft 50a of the motor 50 more than the amount of rotation of the manual adjustment knob 55 in consideration of its reduction ratio.

The rotation unit 5 is provided with a connection line 5a connected to the control unit 3 or the device body 2. Power is supplied to the motor 50 via the connection line 5a. Further, communication between the rotation unit 5 and the control unit 3 or communication between the rotation unit 5 and the device body 2 is performed via the connection line 5a.

(Configuration of Chuck Mechanism 6)

Figure 5:
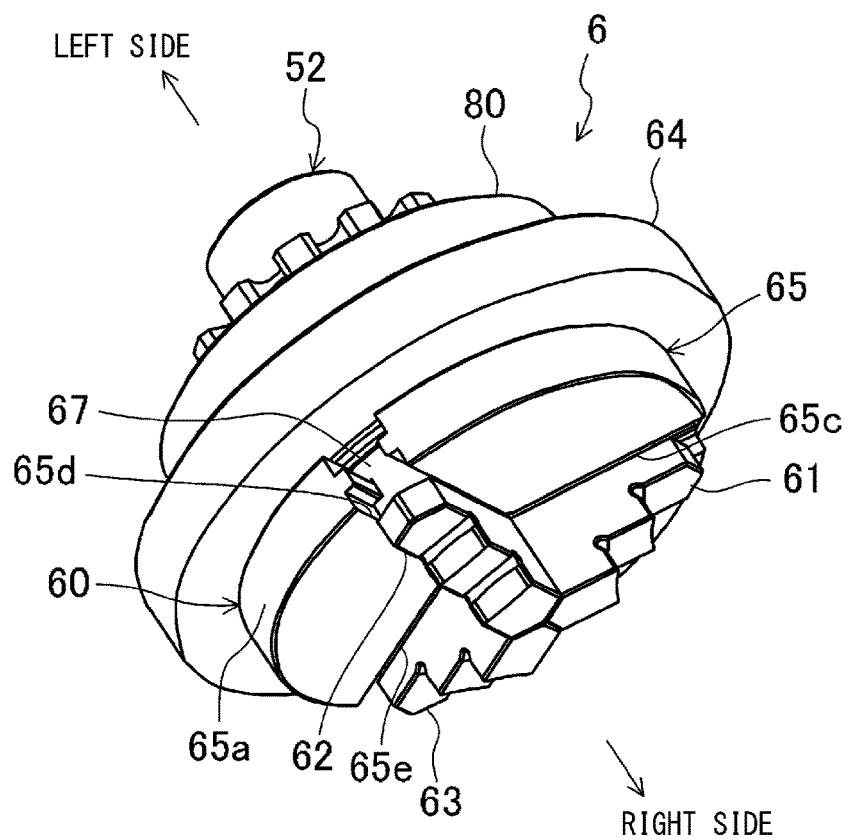
FIG. 5 is a perspective view illustrating a state where a chuck mechanism is attached to the rotating body.
Figure 6:
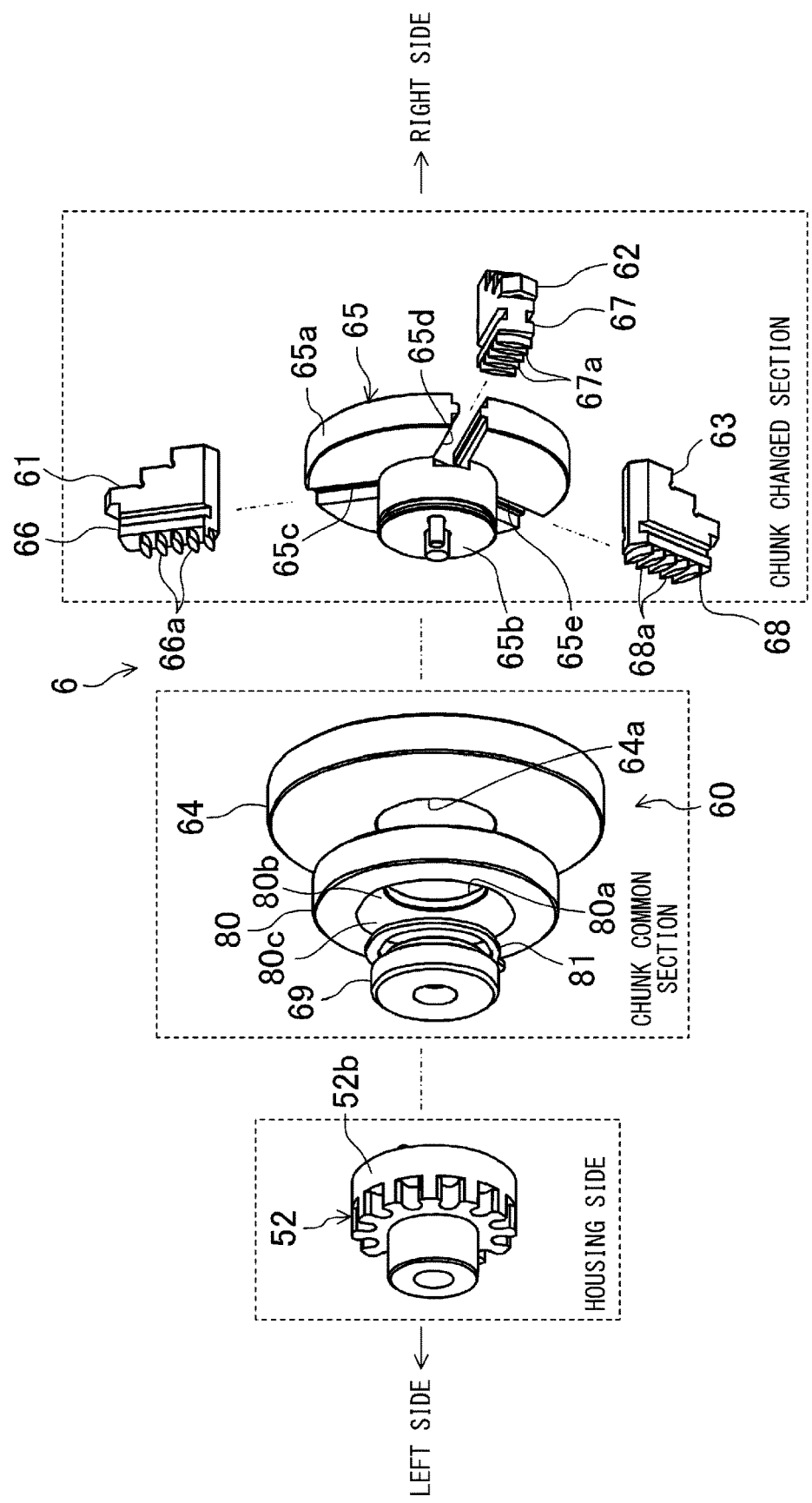
FIG. 6 is an exploded perspective view of the chuck mechanism and the rotating body as viewed from the left side.

As illustrated in FIGS. 5 and 6, the chuck mechanism 6 includes: a chuck body 60 attached to and detached from the rotating body 52; first to third chuck claws 61 to 63 arranged so as to grip the measurement object W from three directions; an adjusting member 64 configured to change positions of the first to third chuck claws 61 to 63; a fastening member 80 that fastens and fixes the chuck body 60 to the rotating body 52. The chuck body 60 is rotated about the rotation axis B together with the rotating body 52 by the motor 50 in the state of being fastened and fixed to the rotating body 52. Further, the chuck body 60 includes: a holding member 65 that holds the first to third chuck claws 61 to 63; and a fastened member 69 forming a fastened portion.

The holding member 65 has a guide plate portion 65a which guides the first to third chuck claws 61 to 63 in the radial direction and a boss portion 65b to which the fastened member 69 is fixed, and these portions are integrated. The boss portion 65b protrudes from a left side surface of the fastened member 69 toward the left side. An axis of the boss portion 65b and an axis of the guide plate portion 65a are located on the rotation axis B (illustrated in FIG. 1). The guide plate portion 65a is provided with a first groove portion 65c, a second groove portion 65d, and a third groove portion 65e. These first to third groove portions 65c, 65d, and 65e extend radially in the radial direction and are arranged at intervals in the circumferential direction. Ends of the first to third groove portions 65c, 65d, and 65e are open on an outer peripheral surface of the guide plate portion 65a.

The first to third chuck claws 61 to 63 have first to third sliders 66 to 68, respectively. The first to third sliders 66 to 68 are members which are inserted into the first to third groove portions 65c, 65d, and 65e of the guide plate portion 65a, and slide in the longitudinal direction inside the first to third groove portions 65c, 65d, and 65e, respectively. The first to third chuck claws 61 to 63 are fixed to right surfaces of the first to third sliders 66 to 68, respectively, and protrude to the right side from the guide plate portion 65a.

First to third convex portions 66a, 67a, and 68a are provided on left surfaces of the first to third sliders 66 to 68, respectively, so as to protrude toward the left side. The first to third convex portions 66a, 67a, and 68a protrude to the left side of a left side surface of the guide plate portion 65a.

The adjusting member 64 is a member configured to move the first to third chuck claws 61 to 63 in the radial direction along the first to third groove portions 65c, 65d, and 65e by being manually rotated about the rotation axis B with respect to the chuck body 60 by the user. That is, the adjusting member 64 is formed in a disk shape as a whole, and has an axis arranged on the rotation axis B. A boss insertion hole 64a into which the boss portion 65b is inserted is formed in the central portion of the adjusting member 64. In the state where the boss portion 65b is inserted into the boss insertion hole 64a, the adjusting member 64 is supported to be rotatable about the rotation axis B with respect to the boss portion 65b. Although not illustrated, a spiral strip is formed on a right side surface of the adjusting member 64 so as to protrude toward the right side. The spiral strip extends in a spiral shape with the rotation axis B as the center.

When the boss portion 65b is inserted into the boss insertion hole 64a of the adjusting member 64, the spiral strip engages with the first to third convex portions 66a, 67a, and 68a of the first to third sliders 66 to 68. When the adjusting member 64 is rotated about the rotation axis B in this state, a radial force is applied to the first to third sliders 66 to 68 due to the spiral strip. As a result, the first to third sliders 66 to 68 slide inside the first to third groove portions 65c, 65d, and 65e in the longitudinal direction. That is, the first to third chuck claws 61 to 63 can be moved in the radial direction. Incidentally, a spiral groove may be provided instead of the spiral strip, and any mechanism may be used as long as a rotational motion about the rotation axis B can be converted into a linear motion in the radial direction.

Movement directions of the first to third chuck claws 61 to 63 can be changed by changing a rotation direction of the adjusting member 64. When the measurement object W is gripped by the first to third chuck claws 61 to 63, the adjusting member 64 may be rotated such that the first to third chuck claws 61 to 63 move in directions of approaching each other. As a result, the measurement object W can be gripped by the first to third chuck claws 61 to 63. On the other hand, when removing the measurement object W gripped by the first to third chuck claws 61 to 63, the adjusting member 64 may be rotated in the opposite direction to move the first to third chuck claws 61 to 63 in directions of separating from each other.

The fastened member 69 is a disk-shaped member, and can be attached to the boss portion 65*b* of the holding member 65 by, for example, a retaining ring 81 or the like. In the state where the fastened member 69 is attached to the boss portion 65*b*, both the fastened member 69 and the boss portion 65*b* are integrated to prevent relative rotation. An axis of the fastened member 69 is located on the rotation axis B. An outer diameter of the fastened member 69 is set so as to be insertable into the peripheral wall portion 52*b* of the rotating body 52 of the rotation unit 5.

As illustrated in FIG. 6, the fastening member 80 is a so-called nut, and is configured using an annular member in the present embodiment. An axis of the fastening member 80 is located on the rotation axis B, and a central hole 80*a* into which the boss portion 65*b* can be inserted is formed in the central portion of the fastening member 80. A circular concave portion 80*b* is formed on the left side of the fastening member 80. A screw groove 80*c*, which is screwed into the screw thread of the peripheral wall portion 52*b* of the rotating body 53, is formed on an inner peripheral surface of the concave portion 80*b*.

When the fastening member 80 is rotated to screw the screw groove 80*c* into the screw thread of the peripheral wall portion 52*b* of the rotating body 52, the peripheral wall portion 52*b* enters the concave portion 80*b*. When the fastening member 80 is tightened, a fastening force from the outer side to the inner side in the radial direction is applied to the peripheral wall portion 52*b* due to the action of the screw, and the peripheral wall portion 52*b* is elastically deformed in the radial direction due to this fastening force. At this time, since the fastened member 69 is inserted into the peripheral wall portion 52*b* of the rotating body 53, an inner peripheral surface of the peripheral wall portion 52*b* comes into strong contact with an outer peripheral surface of the fastening member 69 due to the tightening of the fastening member 80, and a frictional force acting between both the surfaces becomes extremely large. As a result, the fastened member 69 is fastened to the rotating body 52 in a non-rotatable state, and the chuck mechanism 6 is attached to the rotating body 52. When removing the chuck mechanism 6, the fastening member 80 may be rotated in the loosening direction, and as a result, a shape of the peripheral wall portion 52*b* is restored.

(Another Form of Chuck Mechanism)

A structure of the chuck mechanism can be changed in accordance with a shape and a size of the measurement object W. A chuck mechanism 700 illustrated in FIG. 7 has first and second chuck claws 601 and 602. That is, the guide plate portion 65*a* of the holding member 65 is formed with first and second groove portions 65*f* and 65*g* extending in the radial direction. Both the first and second groove portions 65*f* and 65*g* are formed so as to pass through the rotation axis B and be located on the same straight line orthogonal to the rotation axis B. A first slider 606 of the first chuck claw 601 is inserted into the first groove portion 65*f*, and a second slider 607 of the second chuck claw 602 is inserted into the second groove portion 65*g*. The first and second sliders 606 and 607 have convex portions (not illustrated) that engage the spiral strip (not illustrated) of the adjusting member 64, and can rotate the adjusting member 64 to be moved in the radial direction.

The measurement object W, which is a box article, can be gripped by separating the first and second chuck claws 601 and 602 from each other. Further, the measurement object W can also be gripped by bringing the first and second chuck claws 601 and 602 of the chuck mechanism 700 close to each other.

(Common Section of Chuck Mechanism)

Figure 7:
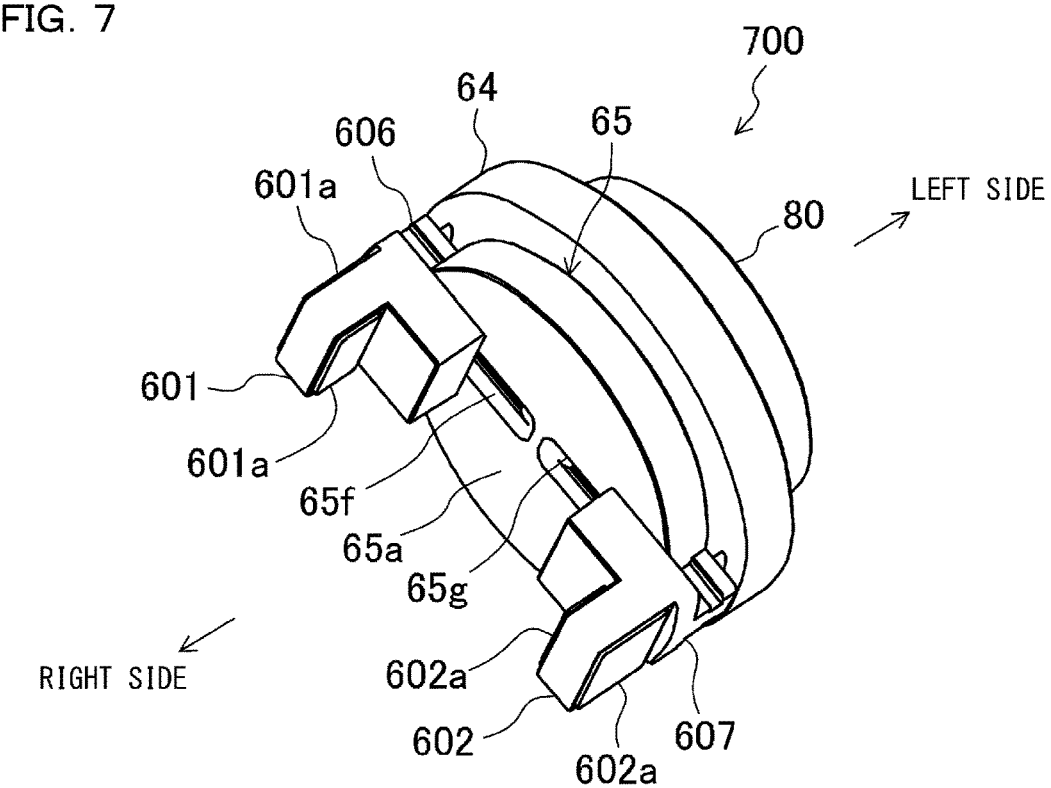
FIG. 7 is a perspective view illustrating another form of the chuck mechanism.

The chuck mechanism 6 illustrated in FIG. 5 is a chuck mechanism for a shaft article that grips the shaft article, and the chuck mechanism 700 illustrated in FIG. 7 is a chuck mechanism for a box article that grips the box article. The structure of the chuck mechanism is not limited to the structures illustrated in the drawings, and may be a chuck mechanism having another structure. In the present embodiment, any chuck mechanism can be attached to and detached from a plurality of chuck mechanisms including the chuck mechanism 6 for the shaft article and the chuck mechanism 700 for the box article. Then, the plurality of chuck mechanisms 6 and 700 have common attachment/detachment sections (the fastened member 69 and fastening member 80) with respect to the rotation unit 5. As a result, workability at the time of replacement of the chuck mechanisms 6 and 700 becomes favorable. That is, the work to change the measurement object W from the shaft article to the box article becomes easy in terms of hardware.

As illustrated in FIG. 6, the rotating body 52 is a member on the housing 50 side, and the chuck mechanism 6 can be divided into a chuck common section and a chuck changed section. The chuck common section is a part that is common between the chuck mechanism 6 illustrated in FIG. 5 and the chuck mechanism 700 illustrated in FIG. 7. The chuck common section includes parts to be fastened to the rotating body 52. The fact that the parts to be fastened to the rotating body 52 are common means that all the chuck mechanisms 6 and 700 can be easily attached and detached without changing the rotation unit 5, which improves convenience.

On the other hand, the chuck changed section is a part that is different between the chuck mechanism 6 illustrated in FIG. 5 and the chuck mechanism 700 illustrated in FIG. 7. The number of chuck claws is different between the chuck mechanism 6 and the chuck mechanism 700, and the number of groove portions in the guide plate portion 65*a* is also different.

(Structure of Measurement Object)

Figure 8A:
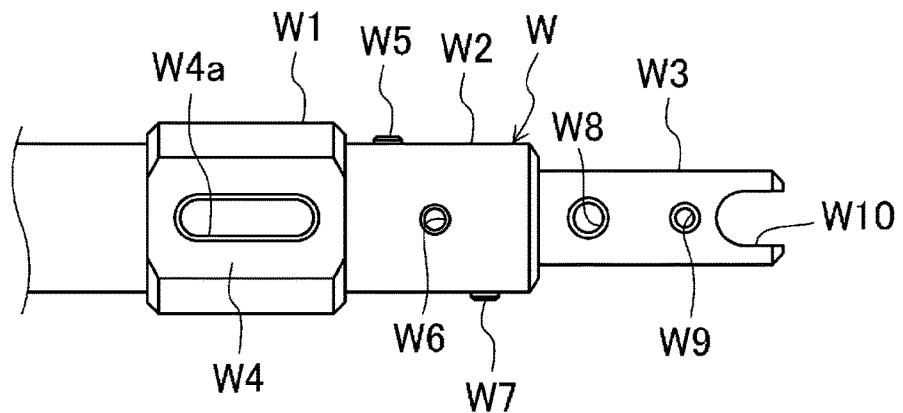
FIG. 8A is a view of a measurement object made of a shaft article as viewed from a side where a D-cut surface is formed.
Figure 8B:
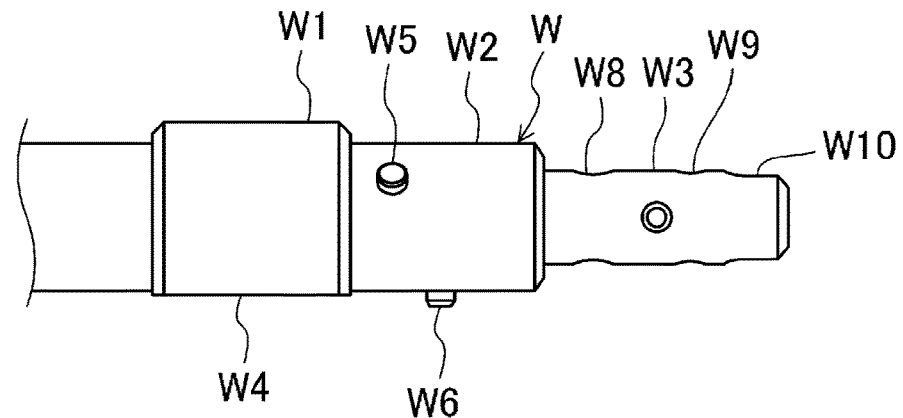
FIG. 8B is a view illustrating a state where the measurement object made of the shaft article is rotated until the D-cut surface is located at the bottom of the view.

Here, the structure of the measurement object W as the shaft article will be described based on FIGS. 8A and 8B, but this does not limit the structure of the measurement object W. Although the measurement object W illustrated in FIGS. 1 and 2 is different from the measurement object W illustrated in FIGS. 8A and 8B, the measurement object W is the shaft article in both the cases. The shaft article is a member having a cylindrical or columnar part, and specifically, is a rotary shaft, a support shaft, a bar, a tubular part, a processing tool, or the like, and may be solid or hollow.

The left side of the measurement object W is a part gripped by the chuck mechanism 6. In the state of being gripped by the chuck mechanism 6, the rotation axis B of the rotation unit 5 and the axis of the measurement object W substantially coincide with each other. The measurement object W has a large diameter portion W1 which is the thickest, an intermediate portion W2 which is thinner than the large diameter portion W1, and a small diameter portion W3 which is thinner than the intermediate portion W2. A flat surface W4 as a characteristic shape is provided on a part of the outer peripheral surface of the large diameter portion W1. The flat surface W4 is also called a D-cut surface since the cross section has a D-shape due to the formation of the flat surface W4. A long groove W4*a* is formed in the central portion of the flat surface W4 in the axial direction of the measurement object W. First to third pins W5 to W7 as characteristic shapes are provided on a part of an outer peripheral surface of the intermediate portion W2 at intervals in the circumferential direction. A first hole W8, a second hole W9, and a groove W10 as characteristic shapes in a part of the small diameter portion W3. The first hole W8 and the second hole W9 are through holes, but do not necessarily penetrate. The groove W10 is formed in an end surface of the measurement object W.

The parts W4 to W10 as the characteristic shapes of the measurement object W, are provided at intervals in the axial direction or provided at intervals in the circumferential direction, but positions and the number of the characteristic shapes are not particularly limited, and there may be one characteristic shape. Further, the characteristic shape is sometimes used as a reference during measurement, and thus, can also be referred to as a reference shape.

Figure 9A:
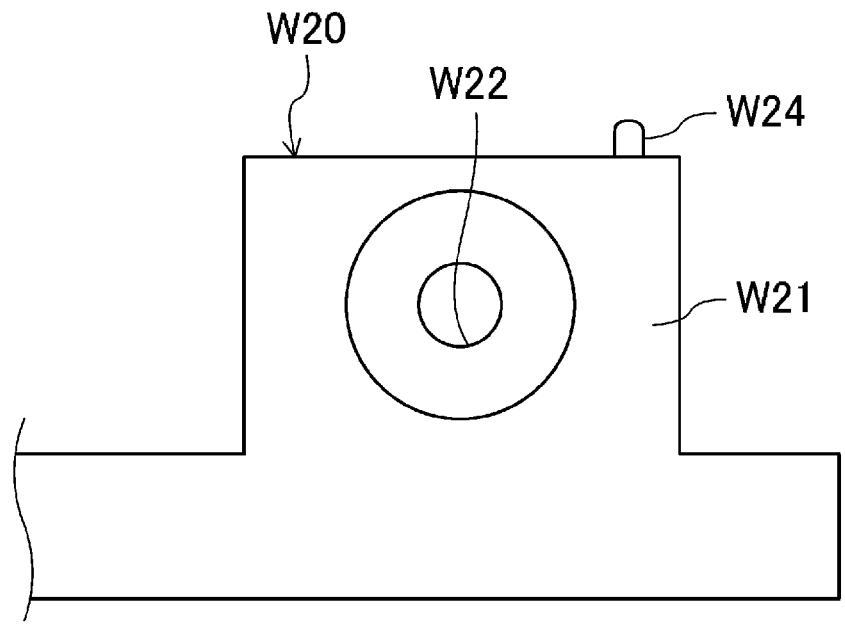
FIG. 9A is a plan view of a measurement object made of a box article.
Figure 9B:
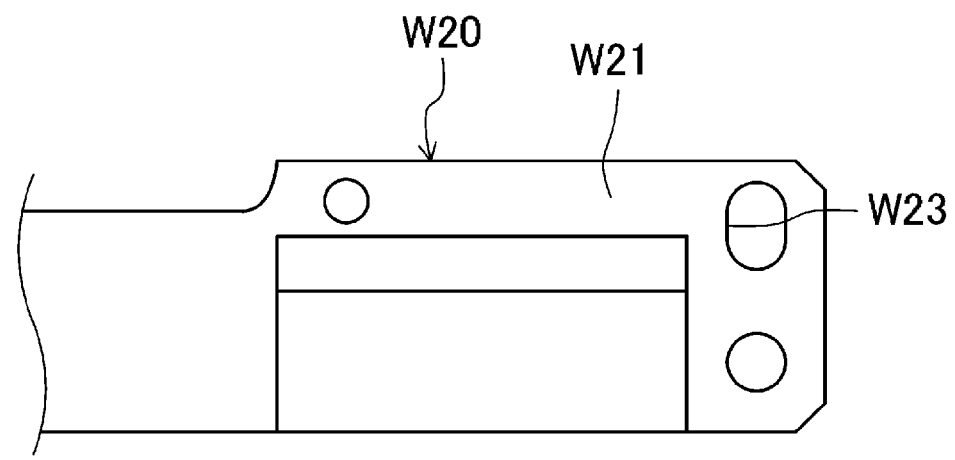
FIG. 9B is a side view of the measurement object made of the box article.

Further, a measurement object W20 which is a box article may be used as illustrated in FIGS. 9A and 9B. The measurement object W20 has a box portion W21 having a shape close to a rectangular parallelepiped. As characteristic shapes, a hole W22, a groove W23, a pin W24, and the like are provided.

(Measurement Setting Mode)

The image dimension measurement device 1 can execute a measurement setting mode to make various settings before operation. After the user boots up the image dimension measurement device 1, the measurement setting mode is started by operating an execution button of the measurement setting mode.

(Measurement Setting of Shaft Article)

In the following description, the case of the measurement object W made of the shaft article will be described. A procedure in the measurement setting mode will be described with reference to a flowchart illustrated in FIG. 10A. In Step SA1 after the start, a characteristic shape is designated and a pattern image is set. Before performing Step SA1, the measurement object W is gripped by the chuck mechanism 6. When executing an auto-angle function to be described later, there are two types: auto-angle based on a characteristic shape and auto-angle based on a pattern image. In Step SA1, the characteristic shape to be used during the auto-angle based on the characteristic shape is designated, and the pattern image to be used during the auto-angle based on the pattern image is set. Both the auto-angle based on the characteristic shape and the auto-angle based on the pattern image may be performed, or only one of them may be performed. Only the characteristic shape may be designated in the case of performing only the auto-angle based on the characteristic shape, and only the pattern image may be set in the case of performing only the auto-angle based on the pattern image. When only the pattern image is set, the pattern image can be searched as a characteristic image, that is, a characteristic shape.

Figure 11:
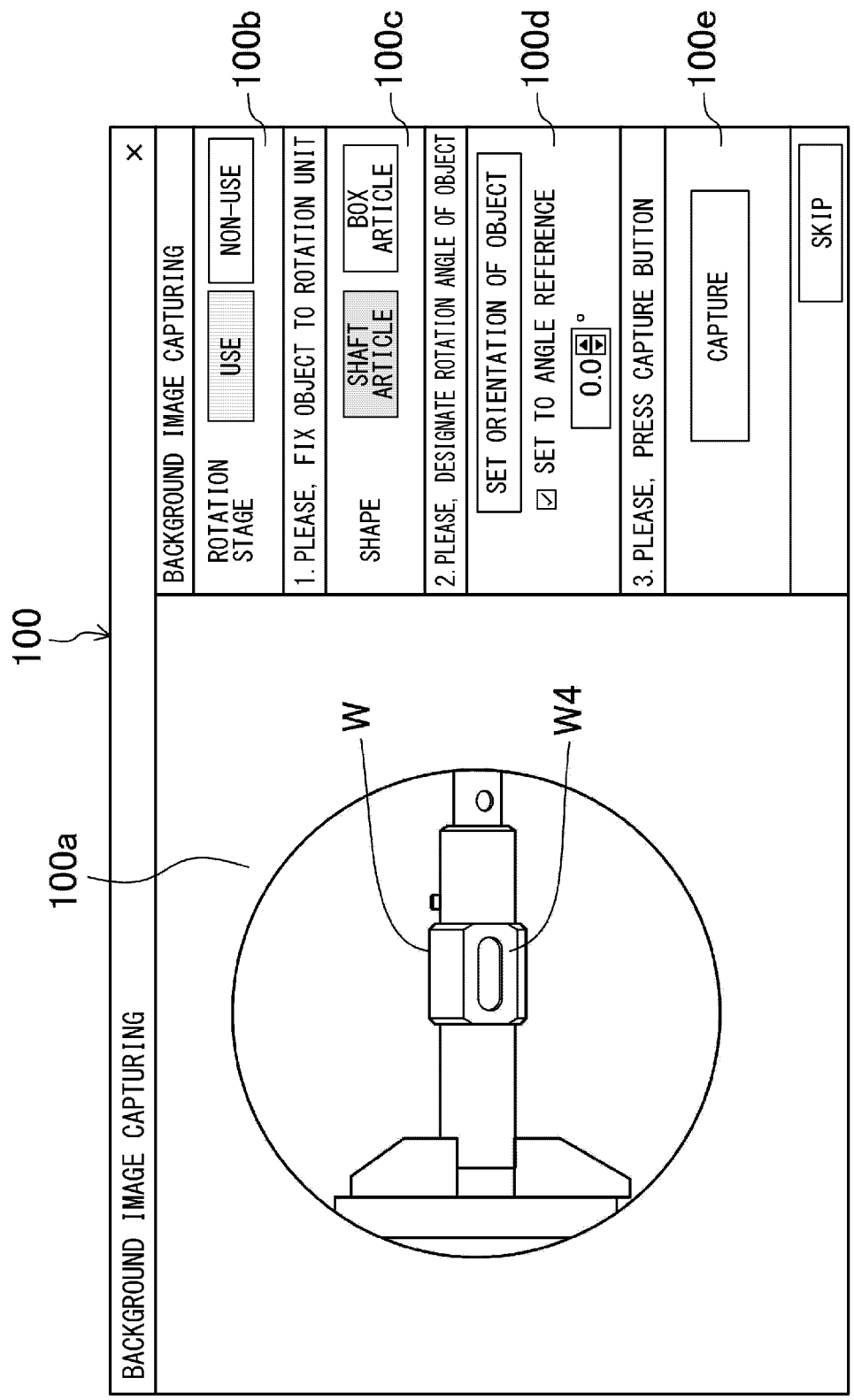
FIG. 11 is a view illustrating an example of a setting user interface screen.

When the specific processing in Step SA1 is described, a UI generation section 32 of the control unit (control section) 3 generates a setting user interface screen 100 as illustrated in FIG. 11 and displays the setting user interface screen 100 on the display section 16 at the initial stage. The setting user interface screen 100 is provided with an image display area 100a displaying a measurement object image captured by the imaging section 15, a rotation unit selection area 100b, a shape selection section 100c to select a shape of the measurement object W, an angle setting section 100d to set a rotation angle of the measurement object W, and an imaging button 100e. In the rotation unit selection area 100b, it is possible to select whether to use the rotation unit 5 or not, and the user can switch between use and non-use of the rotation unit 5 by operating the operation section 14. In this example, the case of using the rotation unit 5 will be described.

The shape selection section 100c is a part that allows the user to select whether the measurement object W is a box article or a shape other than the box article. In this example, a "box article" and a "shaft article" are prepared as options in the shape selection section 100c, but other shapes may be prepared as the options without being limited thereto. Further, options of the "box article" and "other than box article" may be given. The user can operate the operation section 14 to select one option. As a result, the operation section 14 can receive the user's selection operation as to whether the measurement object W is the box article or the shape other than the box article.

When the user selects the "box article", the UI generation section 32 generates a box article user interface screen, and displays the box article user interface screen on the display section 16. On the other hand, when the user selects the "shaft article", the UI generation section 32 generates a shaft article user interface screen and displays the shaft article user interface screen on the display section 16. For example, when the box article is selected, the user interface screen can be set such that an option of the characteristic shape is switched or only a specific characteristic shape can be selected.

Further, the angle setting section 100d is a part in which the user manually sets the rotation angle of the rotation unit 5. Further, the imaging button 100e is a button configured to cause the imaging section 15 to capture an image of the measurement object W in a field-of-view range of the imaging section 15. When the user operates the imaging button 100e by the operation section 14, the imaging section 15 starts to capture the image in the field-of-view range.

Figure 12:
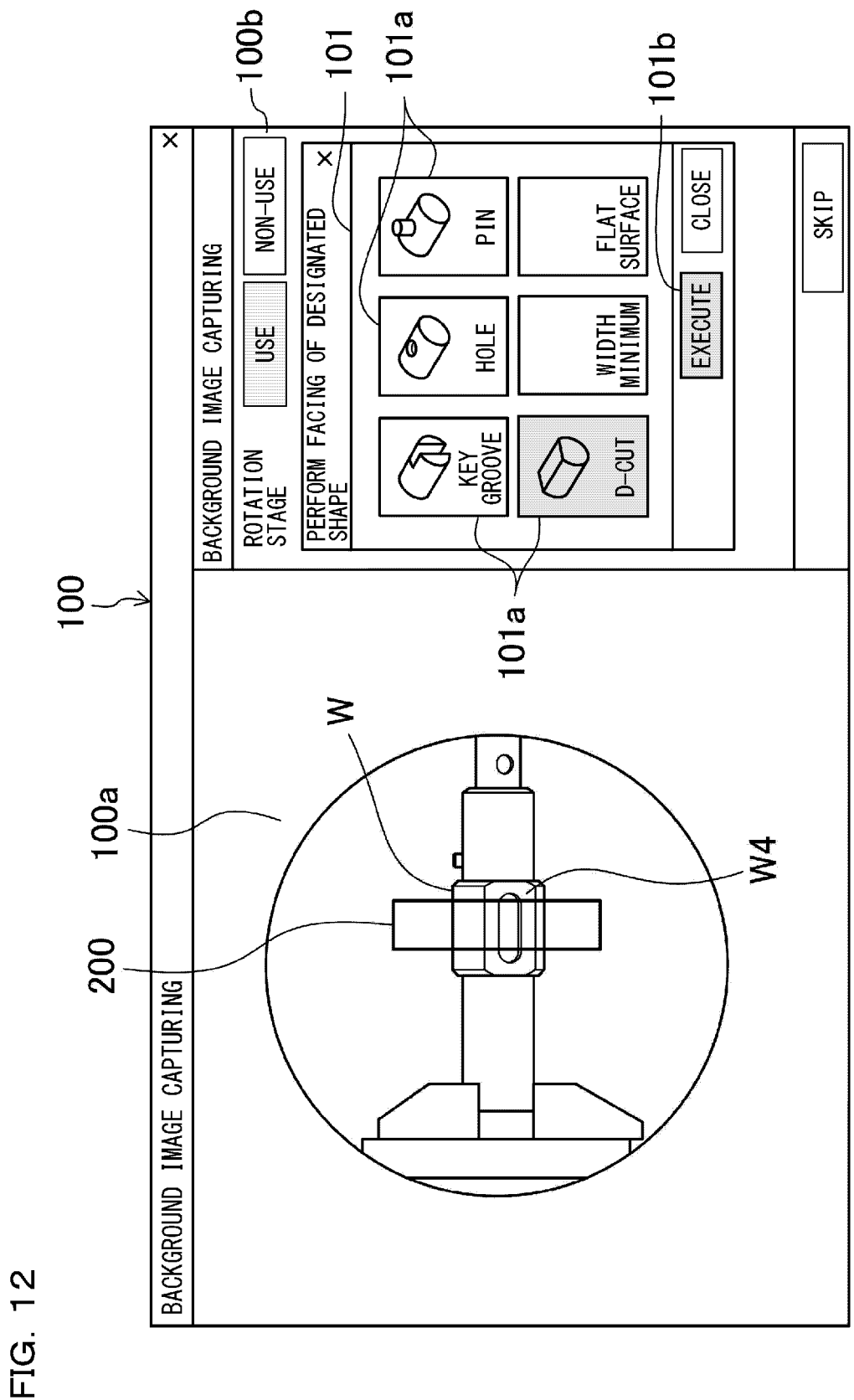
FIG. 12 is a view illustrating an example in which a characteristic shape selection window is displayed in a superimposed manner.

In Step SA1, when the shaft article is selected in the shape selection section 100c illustrated in FIG. 11, the UI generation section 32 generates a characteristic shape selection window 101 and displays the characteristic shape selection window 101 to be superimposed on the setting user interface screen 100 as illustrated in FIG. 12. In Step SA1, the characteristic shape of the measurement object W is further selected in FIG. 12.

In this example, a case where the D-cut surface W4, which is the characteristic shape, is selected as a measurement element of the measurement object W and dimensions of the D-cut surface W4 are measured will be described. In order to measure the dimensions of the D-cut surface W4, it is necessary to make the D-cut surface W4 face the imaging section 16. The facing means that a line perpendicular to the D-cut surface W4 is parallel to the optical axis of the imaging section 15. Further, when the pins W5 to W7 are set as the characteristic shape, it is necessary to make the pins W5 to W7 face the imaging section 16. In this case, the facing means that axial lines of pins W5 to W7 are parallel to the optical axis of the imaging section 15. Further, when the holes W8 and W9 are set as the characteristic shape, it is necessary to make openings of holes W8 and W9 face the imaging section 16. In this case, the facing means that center lines of the holes W8 and W9 are parallel to the optical axis of the imaging section 15. Further, when the groove W10 is set as the characteristic shape, it is necessary to make an end and an opening of the groove W10 face the imaging section 16. Incidentally, in the case of a groove extending in the axial direction of a shaft article such as a key groove, an opening of the key groove is made to face the imaging section 16.

However, in most cases, the D-cut surface W4 does not face the imaging section 15 and deviates from a facing position as illustrated in FIG. 11 in the state where the measurement object W is gripped by the chuck mechanism 6. The image dimension measurement device 1 according to this example is equipped with the auto-angle function (automatic facing function) that can automatically make a characteristic shape face the imaging section 15 based on a predetermined search algorithm even if the characteristic shape does not face the imaging section 15.

Figure 10A:
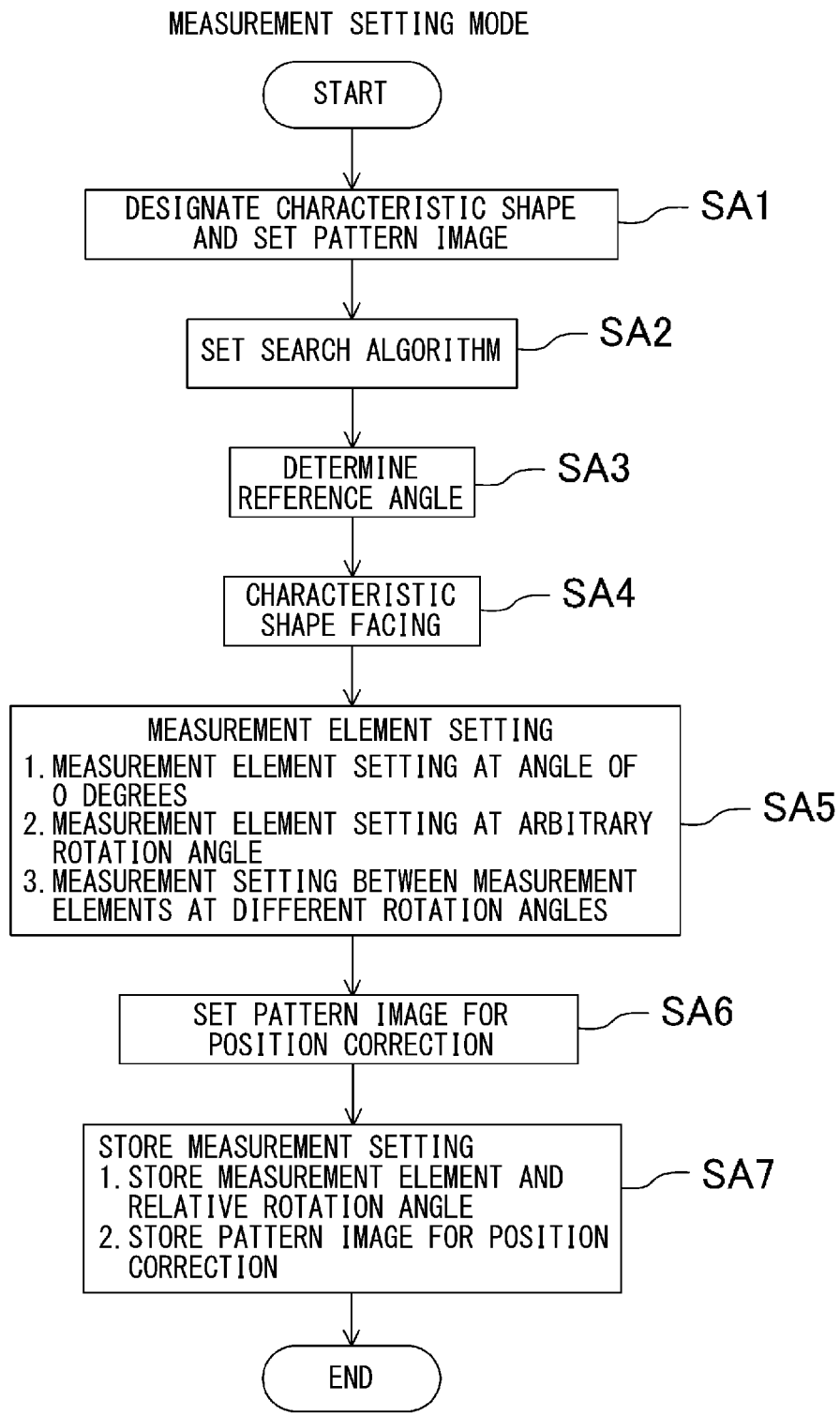
FIG. 10A is a flowchart illustrating an example of a procedure of a measurement setting mode.

A step of setting the search algorithm is Step SA2 illustrated in FIG. 10A. When the auto-angle function is executed, a search algorithm corresponding to the characteristic shape is executed from among a plurality of search algorithms according to types of characteristic shapes. The plurality of search algorithms according to the types of characteristic shapes can be stored in advance in an algorithm storage section 41 of the storage section 4.

First, the auto-angle function will be described. The auto-angle function is executed by an auto-angle execution section 33 provided in the control unit 3 illustrated in FIG. 3. The auto-angle execution section 33 is a part that calculates a rotation angle at which the characteristic shape faces the imaging section 15 based on a plurality of measurement object images captured by the imaging section 15 and rotation angles of the measurement object W when the respective measurement object images are captured, and controls the rotation unit 5 such that the rotation angle of the rotation unit 5 becomes the calculated rotation angle. That is, the auto-angle function is a function of searching for the rotation angle of the measurement object W that can make the characteristic shape face the imaging section 15.

That is, when the auto-angle function is executed, first, a type of the characteristic shape is selected. The characteristic shape selection window 101 is provided with a plurality of icons 101a illustrating characteristic shapes in schematic diagrams. The characteristic shapes are also expressed in characters on the respective icons 101a.

The user operates the operation section 14 and clicks the icon 101a indicating the characteristic shape to be measured from among the plurality of icons 101a in the characteristic shape selection window 101. This operation is a characteristic shape type selection operation, which can be received by the operation section 14. As a result, the input of information regarding a measurement reference can be received on a measurement object image (first measurement object image) illustrated in FIG. 12. Further, the characteristic shape type selection operation is also a search algorithm selection operation internally.

Figure 13A:
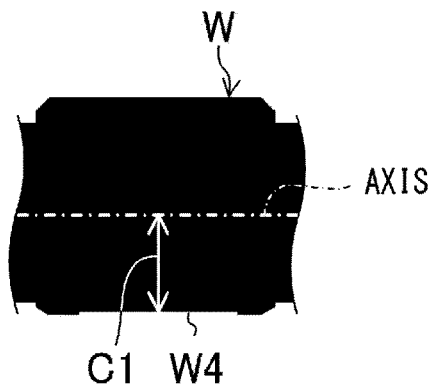
FIG. 13A is a view illustrating the distance between an axis and the D-cut surface when rotation is performed until the D-cut surface is located at the bottom of the view.

When an execution button 101b in the characteristic shape selection window 101 is operated, the auto-angle function is executed, and first, the measurement object W is captured by the imaging section 15 a plurality of times while being rotated by the rotation unit 5. As a result, the imaging section 15 can capture images of the measurement objects W at different rotation angles and generate a plurality of measurement object images. After the generation, each of the measurement object images is stored in the image storage section 40 of the storage section 4 illustrated in FIG. 3, and is stored in association with the rotation angle of the measurement object W when each of the measurement objects has been captured, at this time An algorithm for making the D-cut surface W4 face the imaging section 15 will be described with reference to FIGS. 13A to 13C. FIG. 13A illustrates a measurement object image captured in a state where the measurement object W is illuminated by the transmission illumination section 13b.

Figure 13B:
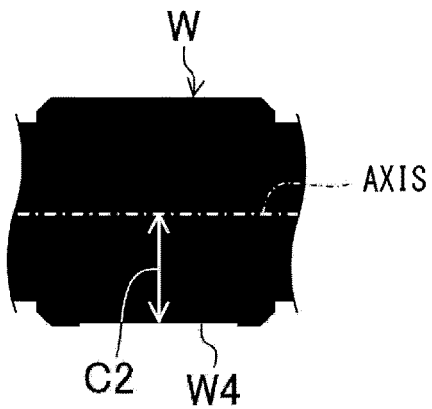
FIG. 13B is a view illustrating the distance between the axis and the D-cut surface when the D-cut surface is made closer to an imaging section than the position illustrated in FIG. 13A.

In this image, the D-cut surface W4 is located at the bottom of the drawing, that is, the D-cut surface W4 and the optical axis of the imaging section 15 are parallel to each other. A distance between the axis of the measurement object W and the D-cut surface W4 on the measurement object image at this time is denoted by C1. FIG. 13B is a measurement object image captured in a state where the D-cut surface W4 is rotated toward a side closer to the imaging section 15 as compared with FIG. 13A, and a distance between the axis of the measurement object W and the D-cut surface W4 on the measurement object image is denoted by C2. The distance C1 is shorter than the distance C2.

Figure 13C:
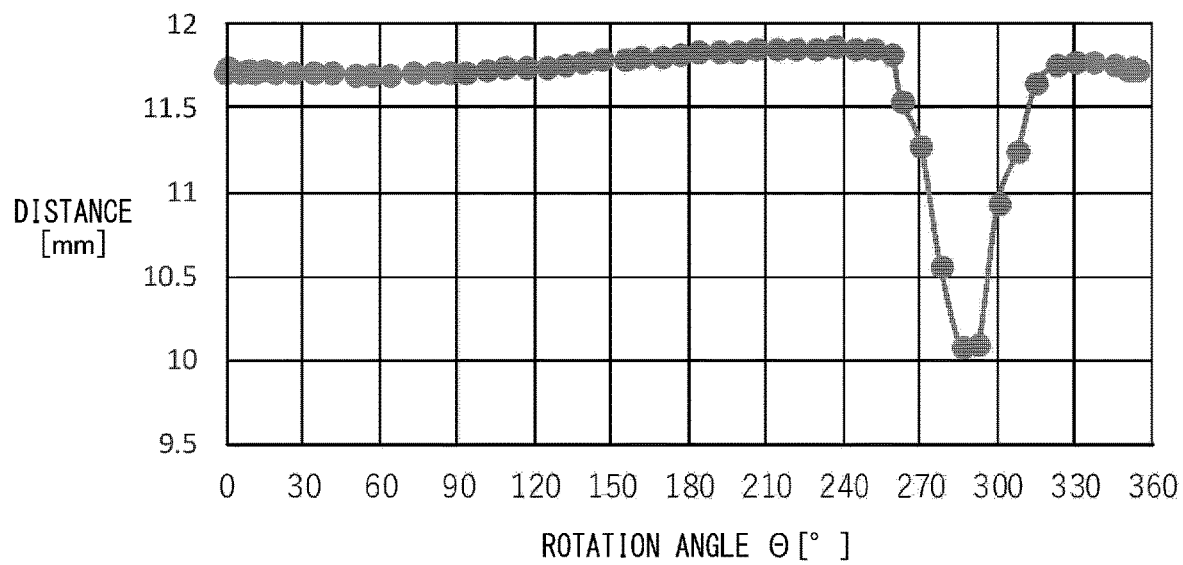
FIG. 13C is a graph illustrating the relationship between a rotation angle of the measurement object and the distance between the D-cut surface and the axis.

The relationship between the distance between the axis of the measurement object W and the D-cut surface W4 on the measurement object image, and the rotation angle of the measurement object W becomes the relationship illustrated in FIG. 13C. A point where the distance is the shortest in a graph is the state of FIG. 13A, and the distance is the longest when the D-cut surface D4 faces the imaging section 15. The D-cut surface D4 can be made to face the imaging section 15 by searching for the rotation angle at which the distance is the shortest and making rotation by 90 degrees. The rotation direction at this time can be determined from the graph. The distances C1 and C2 are evaluation values indicating whether or not the characteristic shape faces the imaging section 15.

Figure 14A:
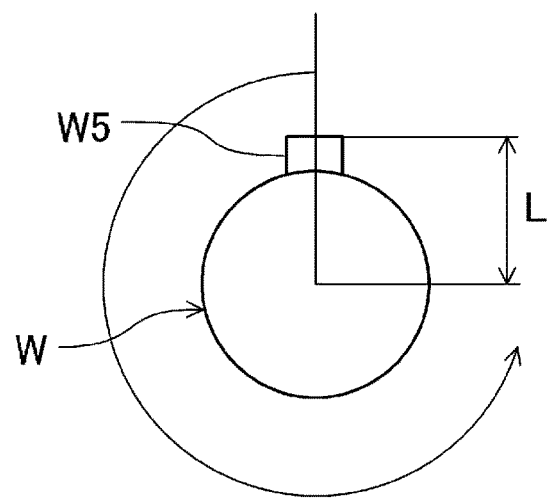
FIG. 14A is a schematic view when a pin has a characteristic shape.
Figure 14B:
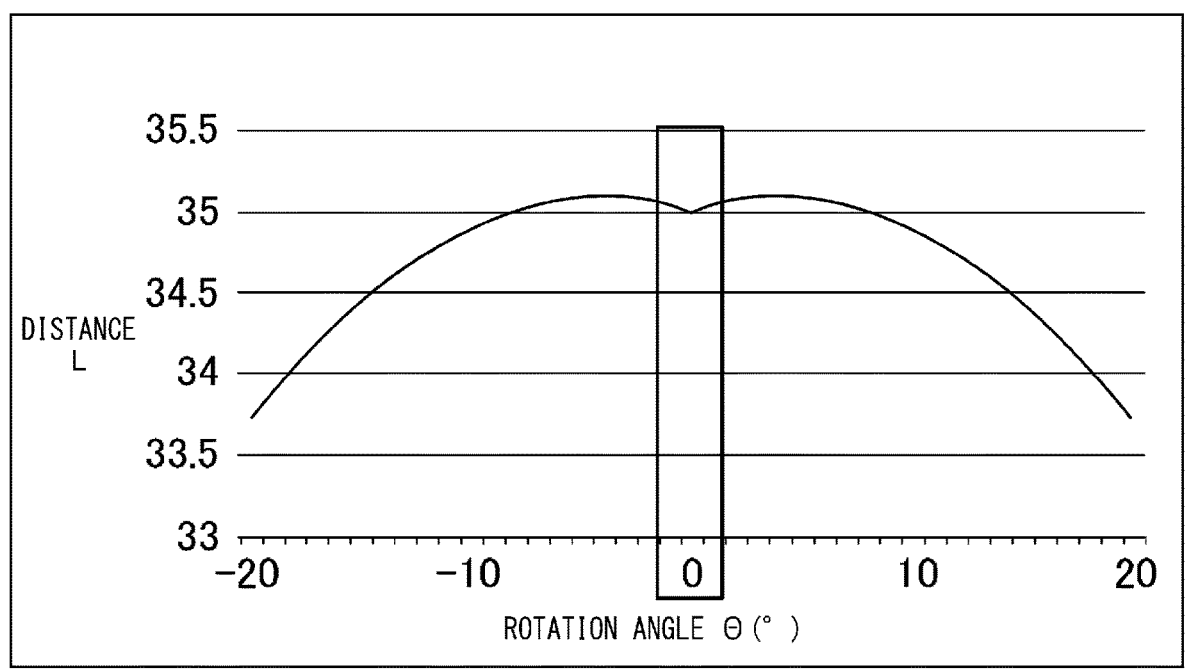
FIG. 14B is a graph illustrating the relationship between the rotation angle of the measurement object and the distance between a pin tip and the axis.

Further, an algorithm for making the pin W5 face the imaging section 15 will be described with reference to FIGS. 14A and 14B. In FIG. 14A, the measurement object W is viewed from the axial direction, and only the pin W5 is illustrated for convenience. A distance L is a distance from the axis of the measurement object W to a tip of the pin W5. FIG. 14B is a graph illustrating the relationship between the distance L and a rotation angle of the measurement object W. As illustrated in this graph, when the measurement object W is rotated, there are two parts as peaks of the distance L. Since the tip of the pin W5 is located between these two peaks, the pin W5 can be made to face the imaging section 15 based on this. The distance L is an evaluation value indicating whether or not the characteristic shape faces the imaging section 15.

In Step SA3 illustrated in FIG. 10A, a reference angle is determined in the process of making the characteristic shape to face the imaging section 15. Thereafter, in Step SA4, the characteristic shape is made to face the imaging section 15.

It is also possible to set various parameters when executing the auto-angle function. FIG. 15 illustrates a parameter setting user interface screen 102 displayed on the display section 16 before the execution of the auto-angle function. The parameter setting user interface screen 102 is generated by the UI generation section 32. The parameter setting user interface screen 102 is provided with an image display area 102a displaying a measurement object image captured by the imaging section 15, an output pattern selection section 102b, a search range setting section 102c, and a search pitch setting section 102d.

In the image display area 102a, an area to execute search can be designated. A frame line 201 can be drawn on the image display area 102a illustrated in FIG. 15 similarly to a frame line 200 illustrated in FIG. 12. Further, it is possible to set any measurement value that is to be maximized or minimized within a designated area. For example, it is possible to set a type such as line-line measurement and circle-circle measurement.

This type can be stored in advance in the storage section 4 as a combination of a preset shape, a measurement content, and the maximum/minimum as illustrated in FIG. 16. As a result, it is possible to save the user's time and effort for setting.

The output pattern selection section 102b illustrated in FIG. 15 is provided with maximum and minimum options, and one of them can be selected by the operation section 14. The maximum of a measurement value is searched for when the maximum is selected, and the minimum of the measurement value is searched for when the minimum is selected. In the search range setting section 102c, it is possible to set an angle range to execute the search. For example, an angle from the reference angle can be set, and the angle range can be set as, for example, plus or minus 90 degrees around the set angle. The search pitch setting section 102d can set a search pitch within the angle range set as described above, and the search is executed at a 5-degree pitch, for example, when the search pitch is set to 5 degrees.

The evaluation value may be the above-described dimensional measurement value, but may be, for example, a degree of coincidence with a template image registered in advance. The template image can be set as an image obtained by capturing an image of the measurement object W whose characteristic shape has a rotation angle facing the imaging section 15. After registering the template image, the imaging section 15 captures an image while rotating the measurement object W, so that a plurality of measurement object images at different rotation angles are continuously generated. For each of these measurement object images, the template image is searched by pattern search, and a rotation angle having the largest correlation value of the degree of coincidence is identified. The identified rotation angle serves as a rotation angle at which the characteristic shape faces the imaging section 15.

In the case of the above-described search by above pattern search, it is also possible to acquire the correlation value after simultaneously executing position search in the XY directions per measurement object image. As a result, the position search and the acquisition of the correlation value can be completed at the same time even in a state where a position on the measurement object image is unknown, such as immediately after the measurement object W is mounted on the chuck mechanism 6.

Further, a window 103 to execute the auto-angle function can be displayed on the display section 16 in the middle of editing the measurement content as illustrated in FIG. 17. The window 103 can be displayed by, for example, operating the operation section 14. When "AA execution" in the window 103 is selected by the operation of the operation section 14, a selection window 103a is displayed on the display section 16. Types of characteristic shapes are displayed in the selection window 103a, and the user can select a desired characteristic shape from these. The auto-angle execution section 33 executes an algorithm corresponding to the selected characteristic shape, and calculates a rotation angle at which the characteristic shape faces the imaging section 15.

Figure 18:
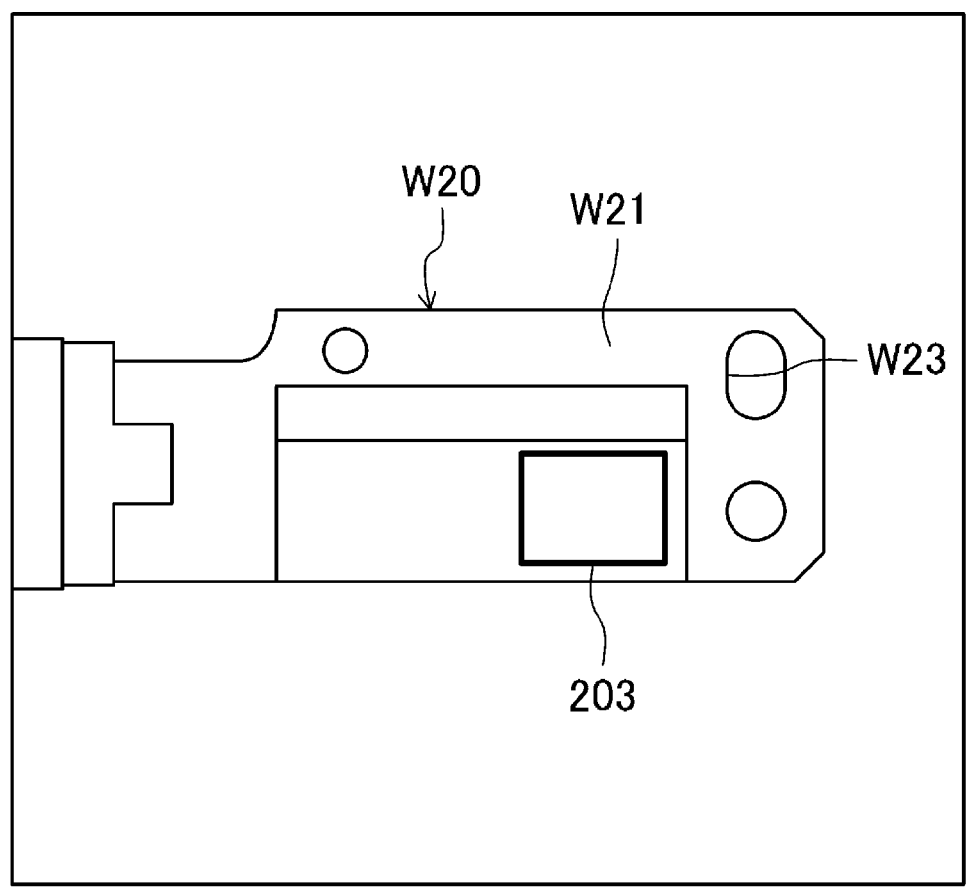
FIG. 18 is a view illustrating a case where the auto-angle function is executed on the measurement object which is the box article.

In this example, an algorithm for making the characteristic shape face the imaging section 15 can be executed even in the case of the measurement object W20, which is the box article, as illustrated in FIG. 18. First, the imaging section 15 captures an image of the measurement object W20, generates a measurement object image (illustrated in FIG. 18), and displays the measurement object image on the display section 16. On the measurement object image, the user designates an area which is desirably made to face the imaging section 15 using, for example, a frame line 203. This designation can be performed using the operation section 14. The area which is desirably made to face the imaging section 15 is a flat part.

The auto-angle execution section 33 executes height measurement at a plurality of arbitrary points in the area surrounded by the frame line 203. In the height measurement, conventional displacement measurement methods can be used, and a contact-type displacement sensor or an optical displacement sensor can be used. Examples of the optical displacement sensor include an auto-focus system. An inclination of a surface of the area surrounded by the frame line 203 is obtained based on the measured height and XY coordinates, and a rotation angle at which the surface faces the imaging section 15 is calculated. Further, it is also possible to perform height measurement in the field of view based on optical focus information and obtain the inclination of the surface of the area surrounded by the frame line 203 based on an area map of the measured height.

Figure 19:
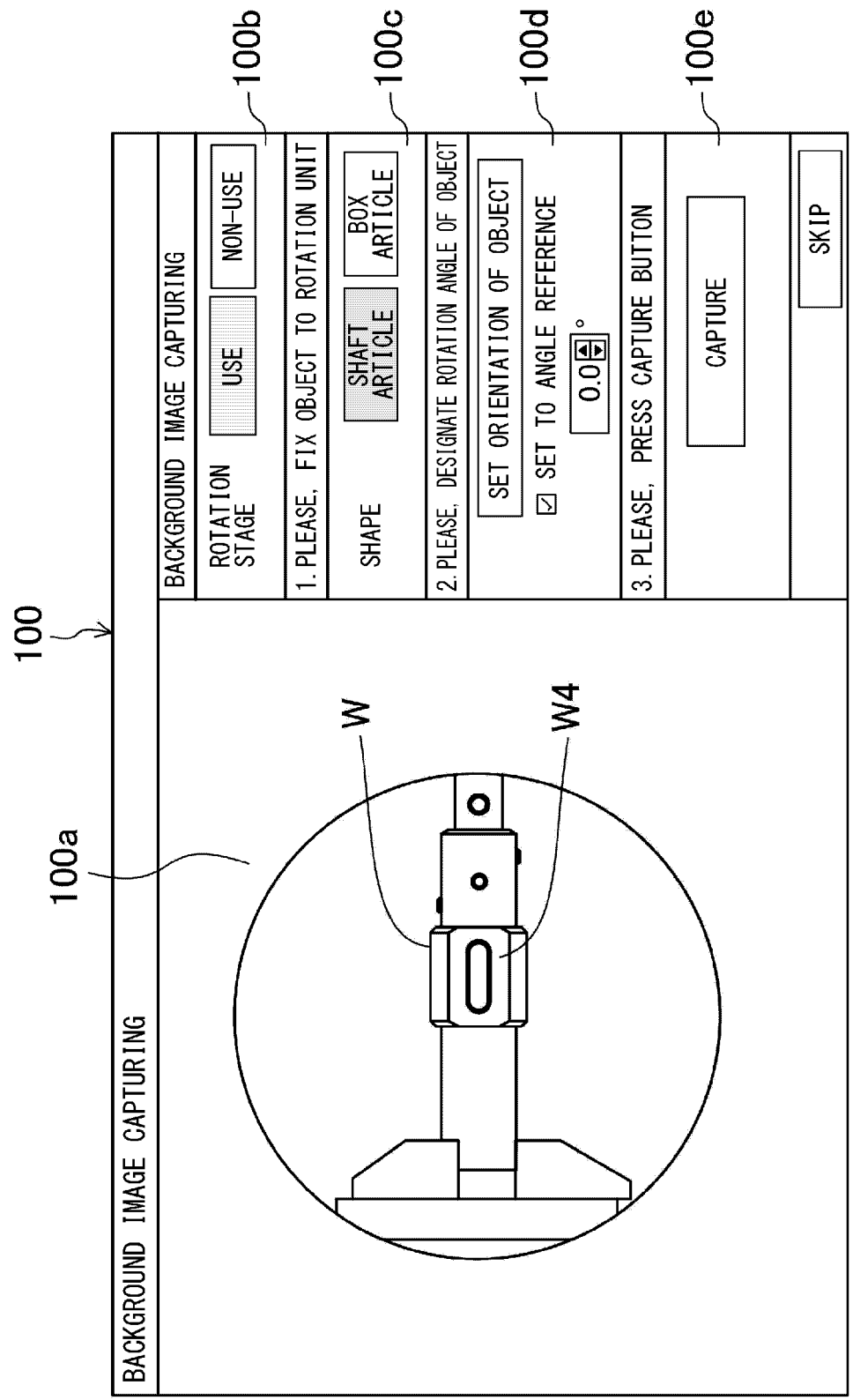
FIG. 19 is a view corresponding to FIG. 11 in a state where a characteristic shape faces the imaging section.

After calculating the rotation angle at which the characteristic shape faces the imaging section 15, the control unit 3 controls the rotation unit 5 so as to have the calculated rotation angle. As a result, the state where the D-cut surface W4 faces the imaging section 15 is achieved as illustrated in FIG. 19, and the setting of the direction of the measurement object W and the setting of the reference angle are completed.

Figure 20A:
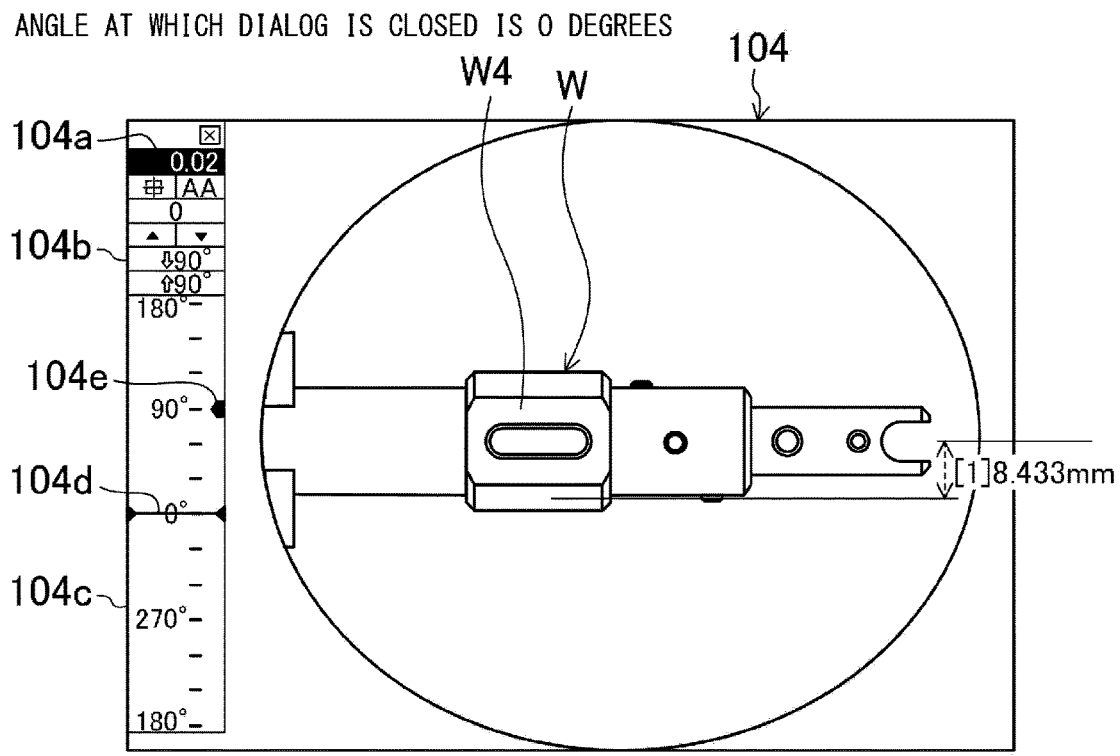
FIG. 20A is a view illustrating an example of a user interface image displaying a measurement object image in a state where an angle at which a dialog is closed is 0 degrees.
Figure 20B:
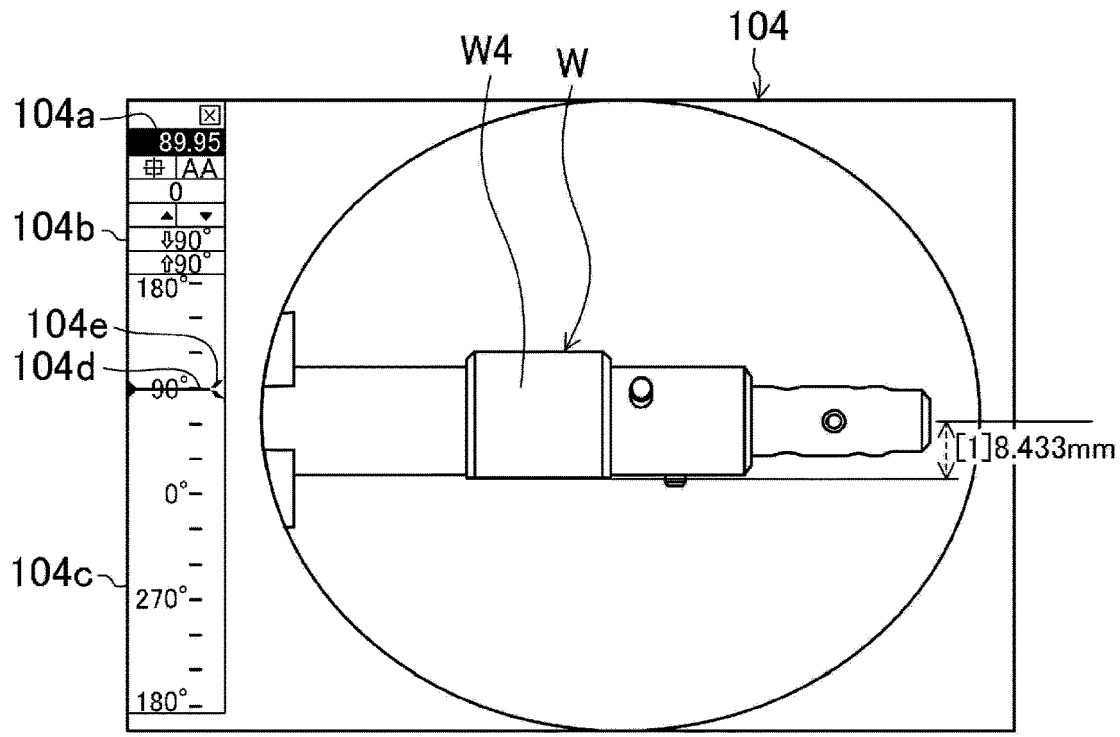
FIG. 20B is a view illustrating an example of the user interface image displaying the measurement object image in a state where an element used to detect a direction of the measurement object is rotated by 90 degrees.

When the operation section 14 closes a dialog, the control unit 3 creates an element used to detect the direction of the measurement object W, and also automatically sets the reference angle set by referring to a shape detection element such that a rotation angle of the measurement object W when the dialog is closed becomes a designated angle (0 degree). FIG. 20A is a user interface image 104 displaying a measurement object image in a state where the angle at which the dialog is closed is 0 degrees, and the element used to detect the direction of the measurement object W is the D-cut surface W4. Further, FIG. 20B is the user interface image 104 displaying the measurement object image in a state where the element (the D-cut surface W4 in this example) used to detect the direction of the measurement object W is rotated by 90 degrees. The angle relationships illustrated in FIGS. 20A and 20B is stored in the storage section 4 as relative rotation angle information.

In Step SA5, a measurement element is set. When the measurement element is set, the rotation of the rotation unit 5 is stopped, an epi-illumination image captured by illuminating the measurement object W with the epi-illumination section 13a and a transmission image captured by illuminating the measurement object W with the transmission illumination section 13b are combined and integrated into one image, and the combined image is incorporated into the user interface image 104 illustrated in FIG. 22 and displayed as a background image. For example, a width of the groove W4a formed on the D-cut surface W4 can be set as the measurement element, and a diameter of the first hole W8 or a width of the groove W10 can also be set as the measurement element. The measurement element is set by the user operating the operation section 14.

The user interface image 104 is provided with a numerical value display area 104a in which a rotation angle from the designated angle of the rotation unit 5 is displayed as a numerical value, a rotation operation area 104b as a control portion to operate the rotation unit 5, and an angle display area 104c in which the rotation angle of the rotation unit 5 is displayed in a bar format. In FIG. 20A, the rotation angle of the measurement object W is the designated angle, and thus, the numerical value display area 104a and the angle display area 104c display about 0 degrees. On the other hand, the rotation has been made by 90 degrees from the state illustrated in FIG. 20A in FIG. 20B, the numerical value display area 104a and the angle display area 104c display about 90 degrees. The angle display area 104c is provided with an angle indicator line 104d indicating a current angle. Further, the angle display area 104c is provided with a reference angle indicating section 104e indicating a rotation angle stored in the storage section 4 as setting information. The angle indicator line 104d can also be moved by the operation section 104. When the angle indicator line 104d is moved, the control unit 3 detects a position of the angle indicator line 104d after the movement. The control unit 3 can rotate the measurement object W by controlling the rotation unit 5 so as to have the rotation angle corresponding to the position of the angle indicator line 104d.

Operation buttons are provided in the rotation operation area 104b. When the operation button is operated by the operation section 14, the control unit 3 detects this. The control unit 3 can rotate the rotation unit 5 in response to the operated button, and can also designate a direction in which the rotation unit 5 is rotated. The operation buttons also include a button to rotate the measurement object W at a fixed angle. Since the fixed angle is 90 degrees in the present embodiment, the measurement object W can be rotated 90 degrees by operating the operation button once, and the measurement object W can be rotated 180 degrees by operating the operation button twice. It is possible to give an instruction to rotate the measurement object W in units of 90 degrees by operating the operation button with the operation section 14. The fixed angle may be an angle obtained by dividing 90 degrees into a plurality of degrees, for example, 30 degrees or 45 degrees. An image of the measurement object W is generated every 90 degrees regardless of whether the fixed angle is 30 degrees or 45 degrees.

Figure 21A:
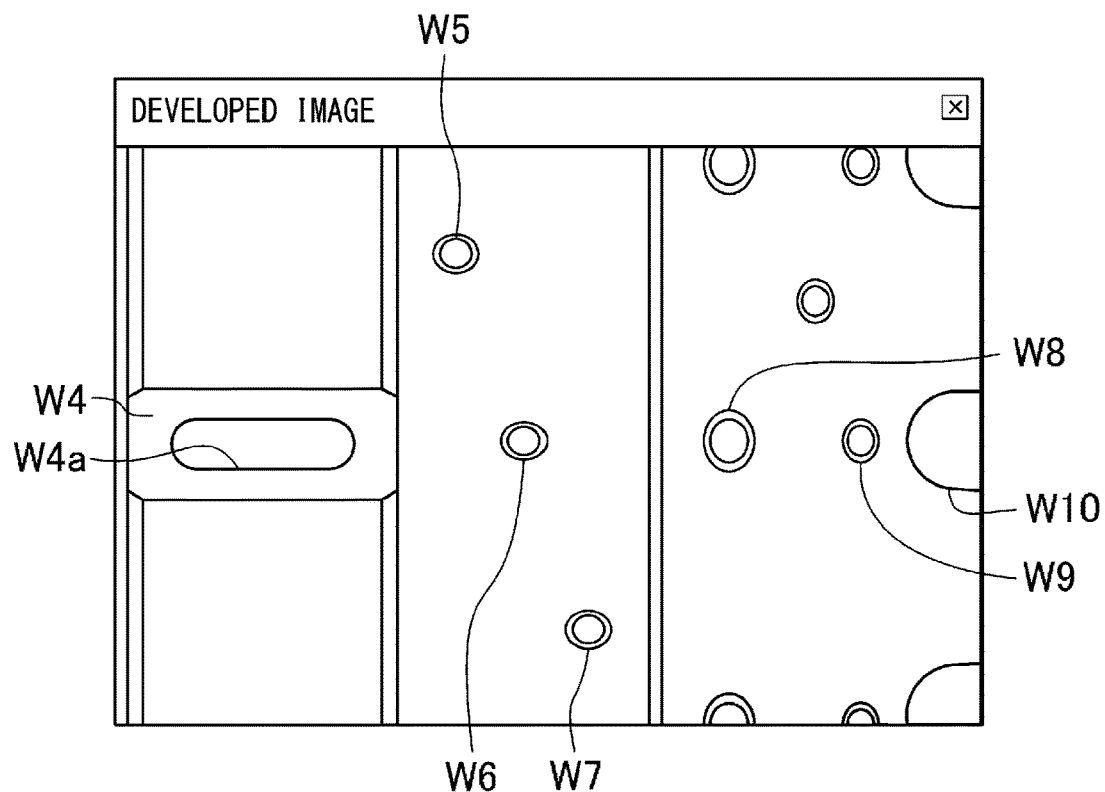
FIG. 21A is a view illustrating an example of a developed image of the measurement object.
Figure 21B:
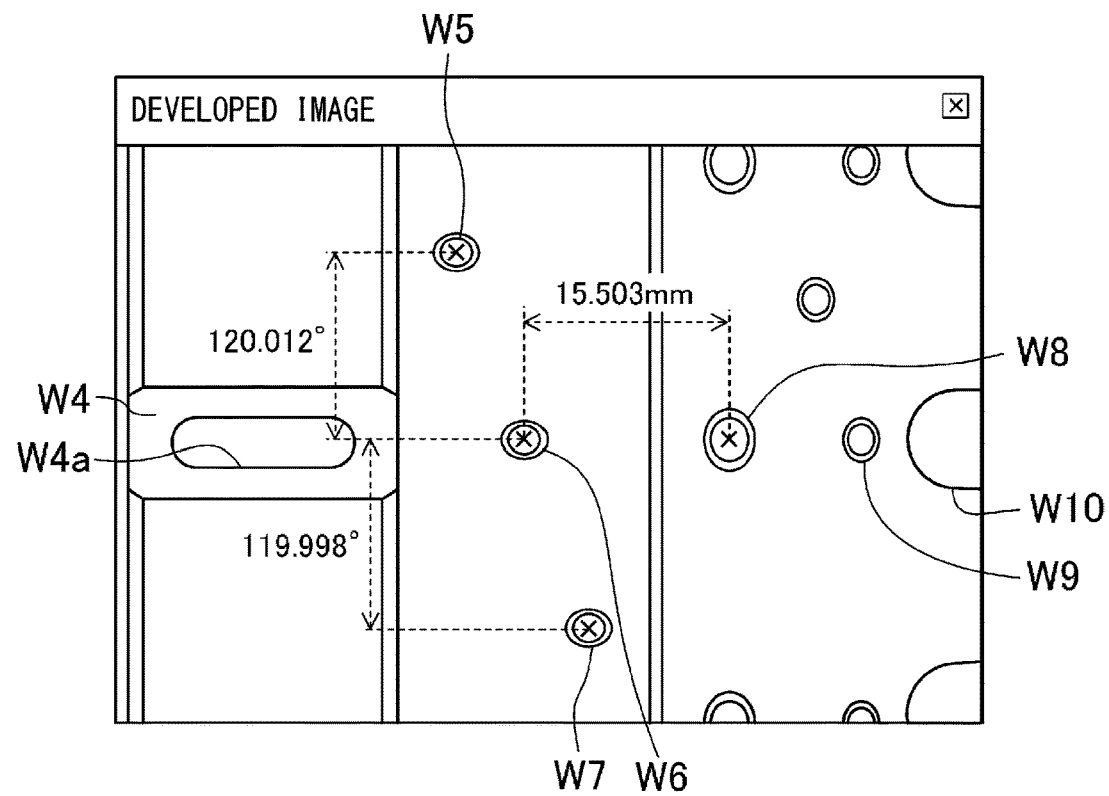
FIG. 21B is a view corresponding to FIG. 21A when dimensions are displayed.

The operation of the rotation unit 5 can be performed based on an operation of the manual adjustment knob 55 described above in addition to the operation of the rotation operation area 104b, and can be also performed based on an operation of designating a position on a developed image. Examples of the developed image are illustrated in FIGS. 21A and 21B. The developed image is an image illustrating a developed shape of the measurement object W obtained by cutting central portions of original images generated by capturing images a plurality of times while rotating the measurement object W to use the central portions as images to be connected, and connecting the plurality of images to be connected. As this developed image is displayed on the display section 16, the stage 12 is moved and the rotation unit 5 is controlled such that a clicked position is displayed in the center of a screen when the user clicks a desired position on the developed image with a mouse, for example, which is the operation section 14. As illustrated in FIG. 21B, a measurement value can be displayed on the developed image.

Figure 22:
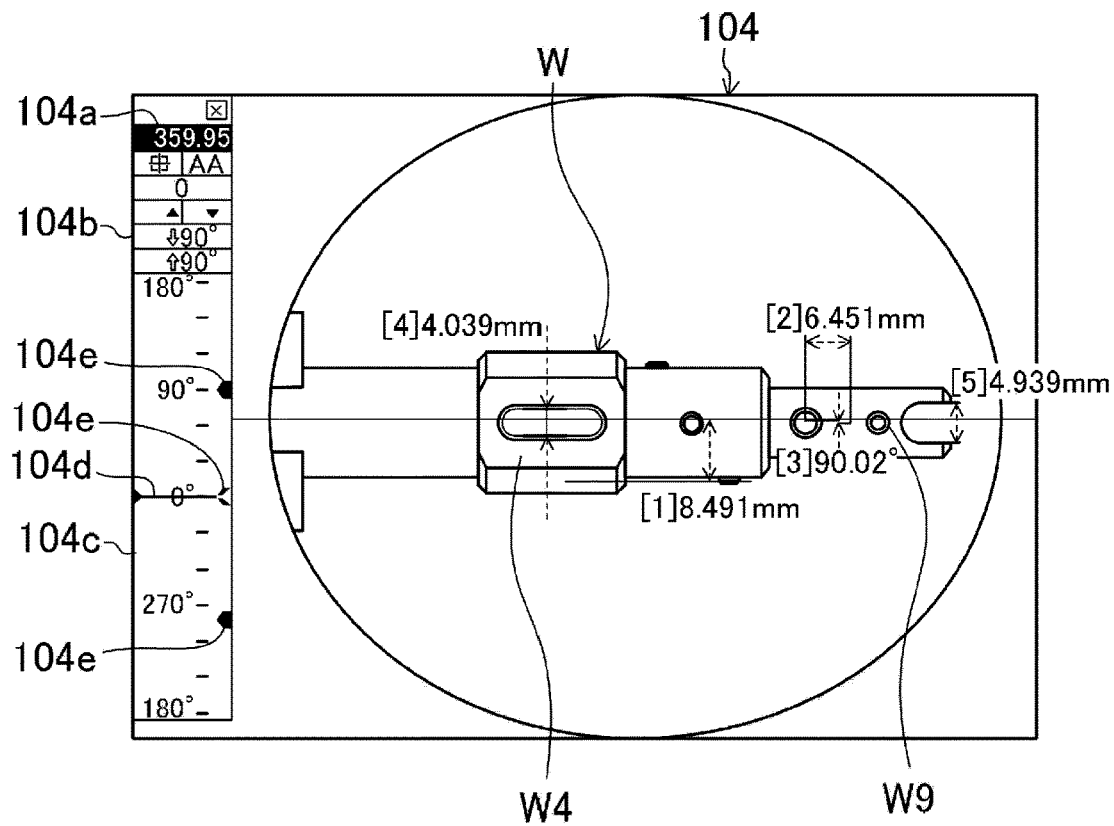
FIG. 22 is a view illustrating an example of a setting content when the rotation angle is 0 degrees.

Further, a measurement object image that receives the input of information regarding a measurement reference is the first measurement object image illustrated in FIG. 12, but an image for setting the measurement element is the image illustrated in FIG. 22, that is, a second measurement object image captured at a different rotation angle from the first measurement object image.

Figure 23:
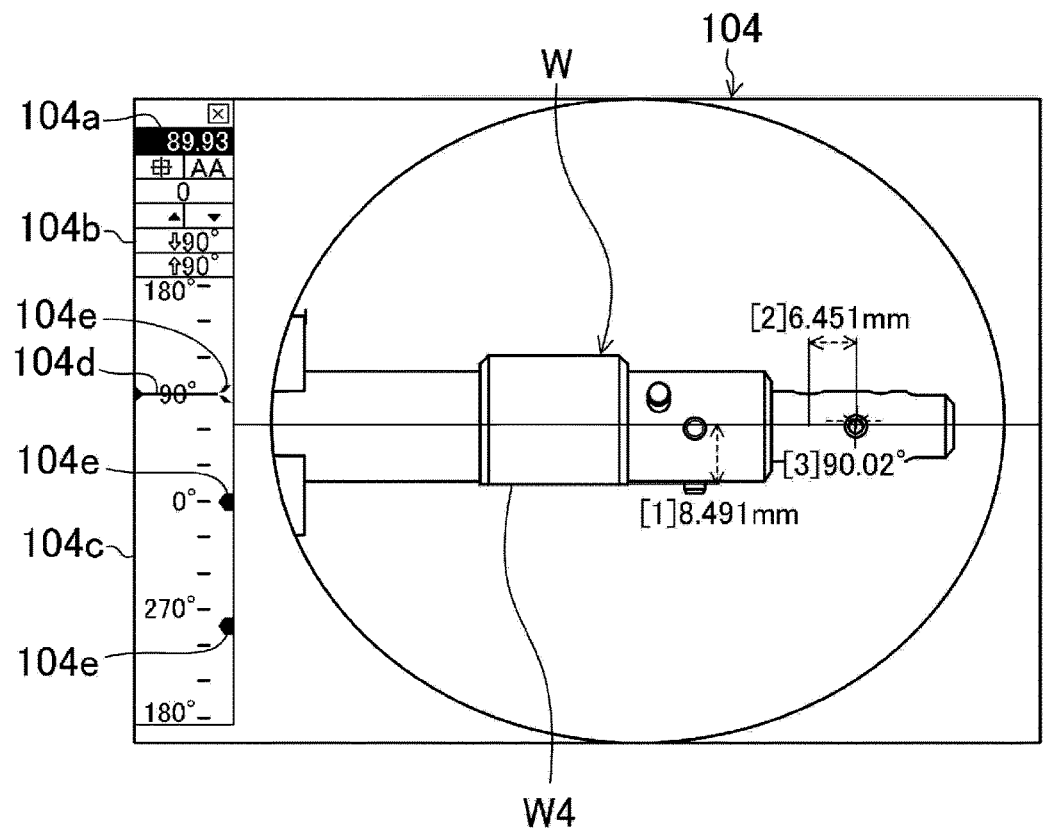
FIG. 23 is a view illustrating an example of a setting content when the rotation angle is 90 degrees.

FIG. 23 is a measurement object image when the rotation angle is 90 degrees, and is an image obtained by combining the epi-illumination image and the transmission image similarly to the measurement object image illustrated in FIG. 22.

FIG. 23 illustrates an example in which a diameter of the second hole W9 is set as a measurement element.

An operation of rotating the measurement object W may be performed by operating the operation button in the rotation operation area 104b or by using the auto-angle function. When using the auto-angle function, the window 103 illustrated in FIG. 17 may be displayed on the display section 16 to enable selection of a characteristic shape.

Figure 24A:
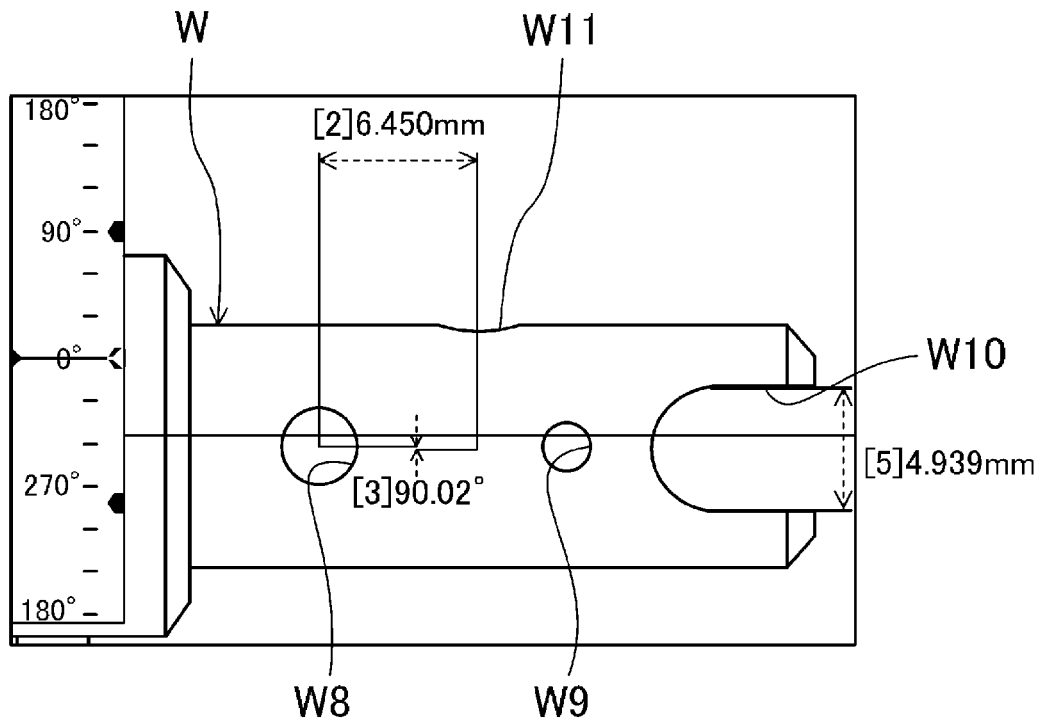
FIG. 24A is a view illustrating an example of a setting content of a measurement element when the rotation angle is 0 degrees.
Figure 24B:
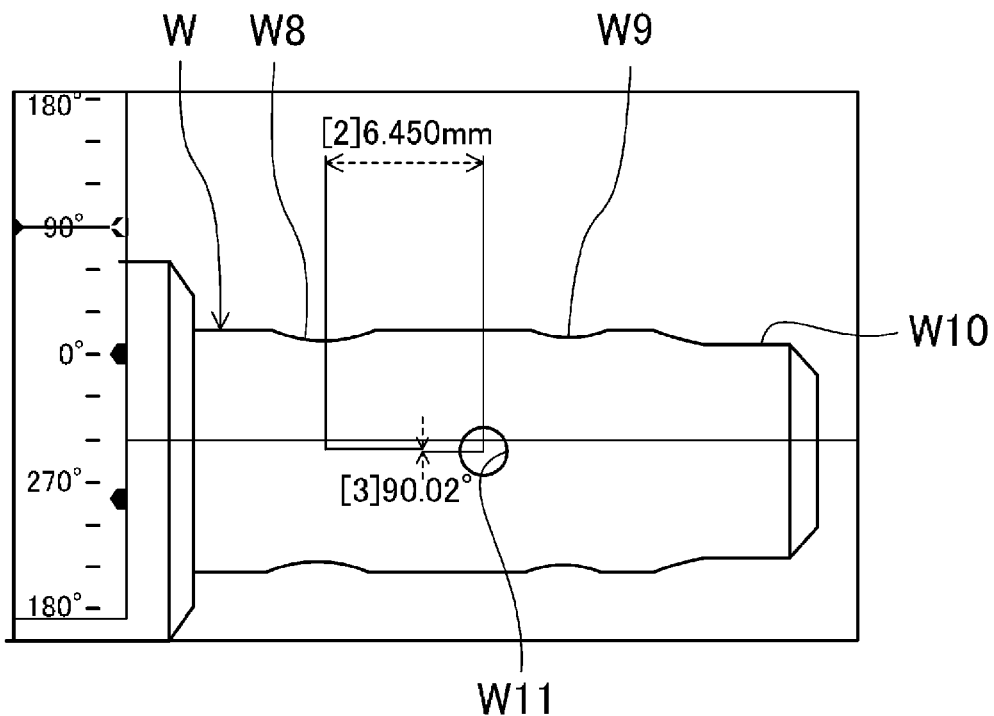
FIG. 24B is a view illustrating an example of a setting content of the measurement element when the rotation angle is 90 degrees.

FIGS. 24A and 24B are views for describing a case of measuring a dimension between two measurement elements. Incidentally, this example illustrates the relationship that the measurement object W is provided with the third hole W11 between the first hole W8 and the second hole W9, and axes of the first hole W8 and the second hole W9 are orthogonal to the axis of the third hole W11.

FIG. 24A illustrates an example of a setting content of a first measurement element (the first hole W8) when the rotation angle is 0 degrees, and the first hole W8 is set on the first measurement object image. FIG. 24B illustrates an example of a setting content of a second measurement element (the third hole W11) when the rotation angle is 90 degrees, and the third hole W11 is set on the second measurement object image different in rotation angle from the measurement object image in which the first measurement element is set. It is possible to measure dimensions of the axis of the first hole W8 and the axis of the third hole W11 by setting the first hole W8 and the third hole W11 as the measurement elements. Incidentally, the difference in the rotation angle of the measurement object image used when the first measurement element and the second measurement element are set is not limited to 90 degrees, and may be any rotation angle at which each measurement element faces the imaging section 15. Further, a measurement element may be set at an arbitrary rotation angle when the measurement element is set. Among the three settings described in Step SA6 of FIG. 10A, the measurement element setting at the angle of 0 degrees and the measurement setting between measurement elements at different rotation angles are not essential.

Figure 25:
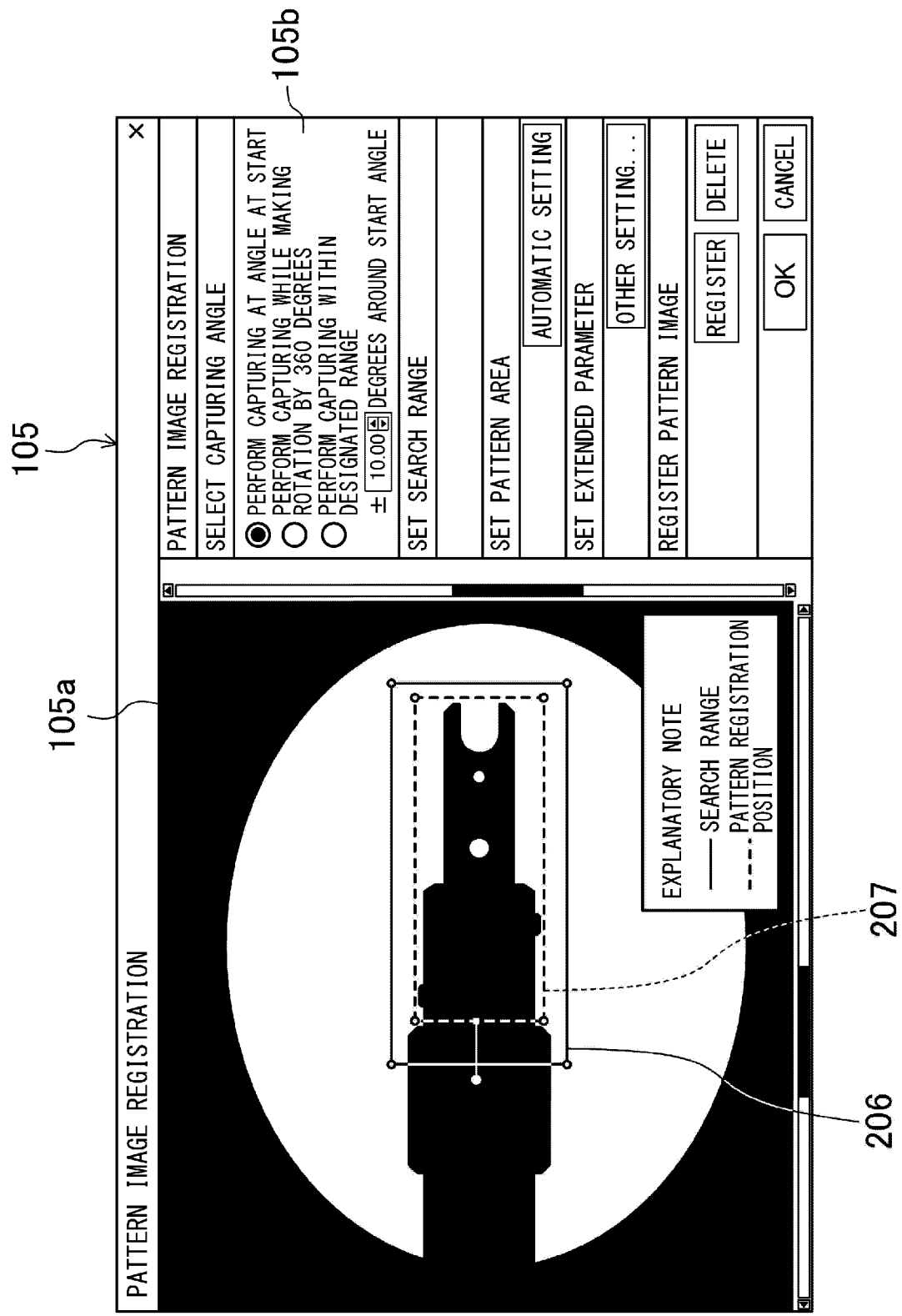
FIG. 25 is a view illustrating an example of a user interface screen for pattern image registration.

When Step SA5 in the flowchart illustrated in FIG. 10A is completed as described above, the processing proceeds to Step SA6 to register a pattern image for position correction. When the pattern image is registered, a user interface screen 105 for pattern image registration illustrated in FIG. 25 is displayed on the display section 16. The user interface screen 105 is provided with an image display area 105a displaying the transmission image captured by illuminating the measurement object W with the transmission illumination section 13b.

In the image display area 105a, a search range frame 206 indicating a range to execute pattern search and a registration range frame 207 indicating a range to be registered as a pattern image are displayed to be superimposed on the transmission image. Positions and sizes of the search range frame 206 and the registration range frame 207 can be arbitrarily set by the user operating the operation section 104. As the operation section 104 is operated, an arbitrary part of the measurement object W can be surrounded by the registration range frame 207. As a result, the arbitrary part of the measurement object W can be registered as the pattern image, and position information of the pattern image can also be registered.

The user interface screen 105 is provided with a selection section 105b to select an imaging angle. In the selection section 105b, it is possible to select whether to perform pattern search on an image captured at a start angle, to perform pattern search on an image captured while rotating the measurement object W by 360 degrees, or to perform pattern search on an image captured while making rotation within a designated range.

When Step SA6 in the flowchart illustrated in FIG. 10A is completed as described above, the processing proceeds to Step SA7 to store the measurement setting in the storage section 4. In Step SA7, the measurement element and the relative rotation angle are stored. That is, any degree by which the set rotation angle of the measurement element is rotated relative to the reference angle is stored. Further, the pattern image for position correction set in Step SA6 is also stored in Step SA7.

(Detailed Flow of Facing)

Figure 10B:
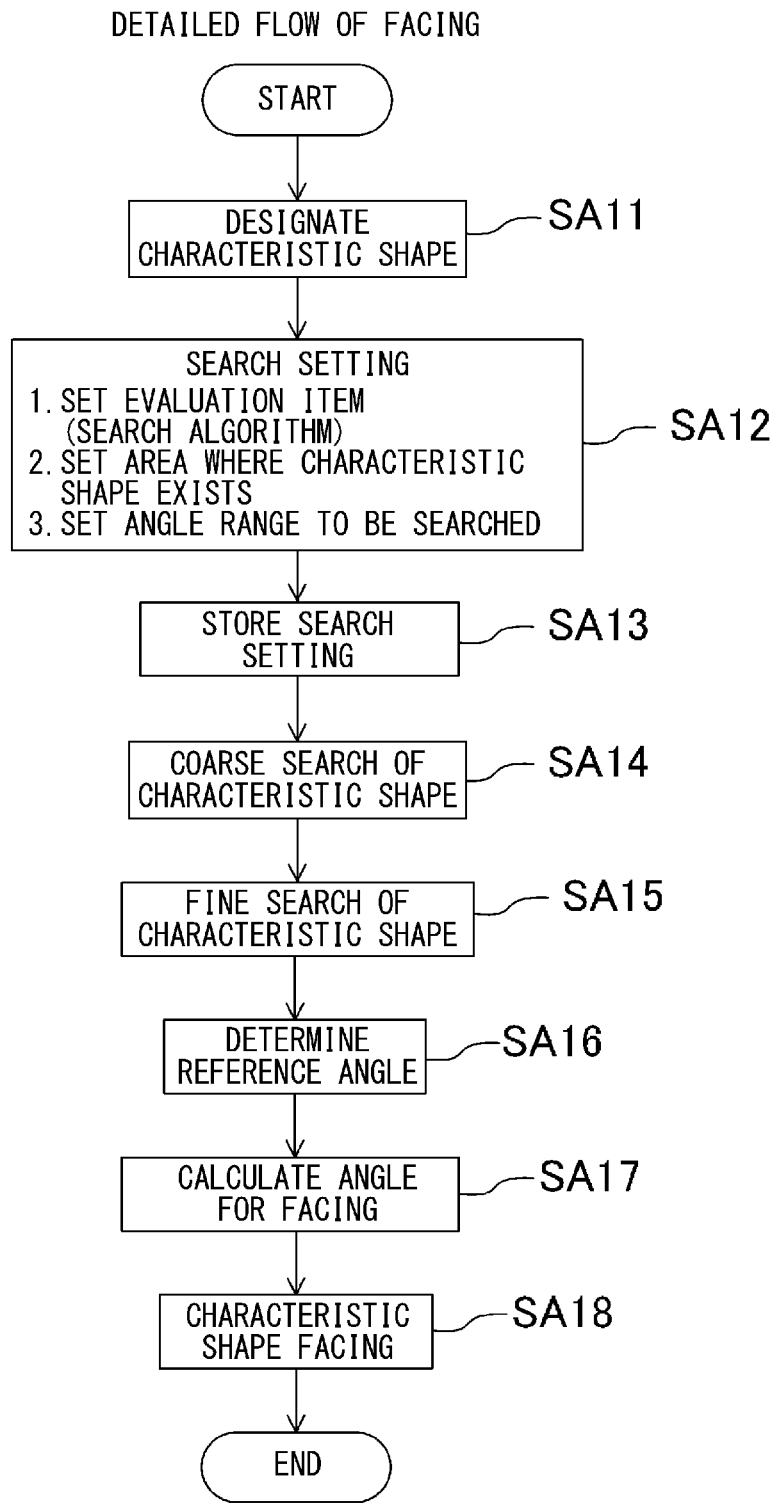
FIG. 10B is a flowchart illustrating details of the procedure of the measurement setting mode.

The processing at the time of setting is not limited to the procedure illustrated in FIG. 10A, and may be, for example, a procedure illustrated in a flowchart illustrated in FIG. 10B. In Step SA11 of the flowchart illustrated in FIG. 10B, a characteristic shape is designated. The designation of the characteristic shape can be the same as the designation of the characteristic shape in Step SA1 of FIG. 10A. Only a pattern image of the measurement object W may be set instead of the characteristic shape. In this case, only an angle range to be searched is searched in the next Step SA12. Either the designation of the characteristic shape or setting of the pattern image may be executed.

In Step SA12, an evaluation item, that is, a search algorithm is set. The evaluation item may be automatically set when a type of the characteristic shape is selected as described in Step SA2 in FIG. 10A, or may be set independently of the operation of selecting the type of the characteristic shape.

In Step SA12, it is possible to set an area where the characteristic shape, for example, the D-cut surface W4 exists. For example, the user designates the area where the D-cut surface W4 exists on the measurement object image displayed on the display section 16. A characteristic shape other than the D-cut surface W4 may be used, and it suffices that the area in which the characteristic shape exists is designated. Specifically, as illustrated in FIG. 12, the frame line 200 is drawn so as to surround the area where the characteristic shape, for example, the D-cut surface W4 exists. Examples of an operation of drawing the frame line 200 include a method of performing diagonally dragging using a mouse or the like, but are not limited thereto. The designation of the area where the characteristic shape exists is received by the operation section 14. When the designation of the area where the characteristic shape exists is received, a position and a size of the area are acquired. For example, there is a case where one measurement object W includes a plurality of characteristic shapes and it is desired to measure only the D-cut surface W4 among them. In this case, only the D-cut surface W4 needs to face the imaging section 15, and thus, only the D-cut surface W4 can be made to face the imaging section 15 without considering the facing with the other characteristic shapes if the user designates the area where the characteristic shape exists as described above. A plurality of areas where characteristic shapes exist may be designated.

In Step SA12, it is also possible to designate an angle range to search for the characteristic shape. For example, a rotation angle range is designated using a currently displayed rotation angle of the measurement object W as the reference. This designation operation is received by the operation section 14. For example, there is a case where characteristic shapes such as the pins W5 to W7 exist on one measurement object W at intervals in the circumferential direction and it is desired to measure only a dimension of the pin W5 among them. In this case, only the pin W5 needs to face the imaging section 15, and thus, only the pin W5 can be made to face the imaging section 15 without considering the facing with the other characteristic shapes if the user designates the angle range in which the pin W5 exists.

When the search setting is completed, the processing proceeds to Step SA13 to store the search setting in the storage section 4. Thereafter, the processing proceeds to Steps SA14 and SA15. That is, a search method focusing on the fact that the measurement object W is rotated by the rotation unit 5 can also be applied in this example. For example, in the case of a rolling shutter in which the imaging section 15 sequentially scans an image line by line from one side of a sensor to the other side, there occurs a phenomenon where a measurement object image is distorted if the image is captured while rotating the measurement object W. If a rotation angle at which a characteristic shape faces the imaging section 15 is searched for based on such a distorted measurement object image, there is a possibility that a decrease in accuracy occurs. However, there is also an advantage that the search time for the rotation angle at which the characteristic shape faces the imaging section 15 can be shortened based on the measurement object image captured while rotating the measurement object W.

The image dimension measurement device 1 is configured to be capable of executing a search process that can enhance the search accuracy while shortening the search time. That is, the imaging section 15 generates a plurality of rotation-time images obtained by capturing an image of the rotating measurement object W a plurality of times and a plurality of stop-time images obtained by capturing an image of the measurement object W whose rotation is stopped a plurality of times as measurement object images. In Step SA14, the auto-angle execution section 33 first executes coarse search for the rotation angle at which the characteristic shape faces the imaging section 15 based on the plurality of rotation-time images. Through this coarse search, it is possible to identify a rotation angle range in which the possibility that there is a rotation angle in which the characteristic shape faces the imaging section 15 is relatively high. Thereafter, in Step SA15, fine search is executed based on the plurality of stop-time images in the rotation angle range identified by the coarse search in Step SA14 to calculate the rotation angle at which the characteristic shape faces the imaging section 15. The rotation angle range and a pitch at which the coarse search is executed can also be changed. Further, there is fluctuation in the state where the measurement object W is rotated, an algorithm for detecting and removing the amount of fluctuation can be applied. Incidentally the coarse search in Step SA14 may be omitted.

Thereafter, in Step SA16, a reference angle is determined in the process of making the characteristic shape to face the imaging section 15 in the same manner as in Step SA3 illustrated in FIG. 10A. The reference angle may be an angle when the characteristic shape faces the imaging section 15, or may be an angle at which a characteristic appears in the evaluation value of the evaluation item set in Step SA12.

In Step SA17, the angle at which the characteristic shape faces the imaging section 15 is calculated. Next, in Step SA18, the characteristic shape is made to face the imaging section 15 in the same manner as in Step SA4 illustrated in FIG. 10A. Incidentally, the processes of Steps SA5 to SA7 in FIG. 10A can be executed after Step SA18.

(Measurement Setting of Box Article)

When performing measurement setting of a box article, the "box article" on the setting user interface screen 100 illustrated in FIG. 11 is selected in Step SA1 of the flowchart illustrated in FIG. 10A. Thereafter, "width minimum" in the characteristic shape selection window 101 illustrated in FIG. 12 is selected. Further, an area to execute search is designated as in the case of the shaft article. The auto-angle execution section 33 searches for a rotation angle that minimizes the width, which is an evaluation value, and calculates a rotation angle at which a characteristic shape faces the imaging section 15.

The control unit 3 controls the rotation unit 5 so as to rotate the measurement object W20 in units of 90 degrees when the box article is selected by the operation section 14. The box article often has, for example, a rectangular parallelepiped shape, and each of four side surfaces of the rectangular parallelepiped can be captured by the imaging section 15 by rotating the measurement object W20 in units of 90 degrees. When a rotation angle at the time of capturing a certain measurement object image is 0 degrees, a rotation angle at the time of capturing the next measurement object image may be 90 degrees, 180 degrees, or 270 degrees. Further, stop after rotation by 90 degrees, stop after continuous rotation by 180 degrees, and stop after continuous rotation by 270 degrees are also included in the rotation in units of 90 degrees.

Figure 26A:
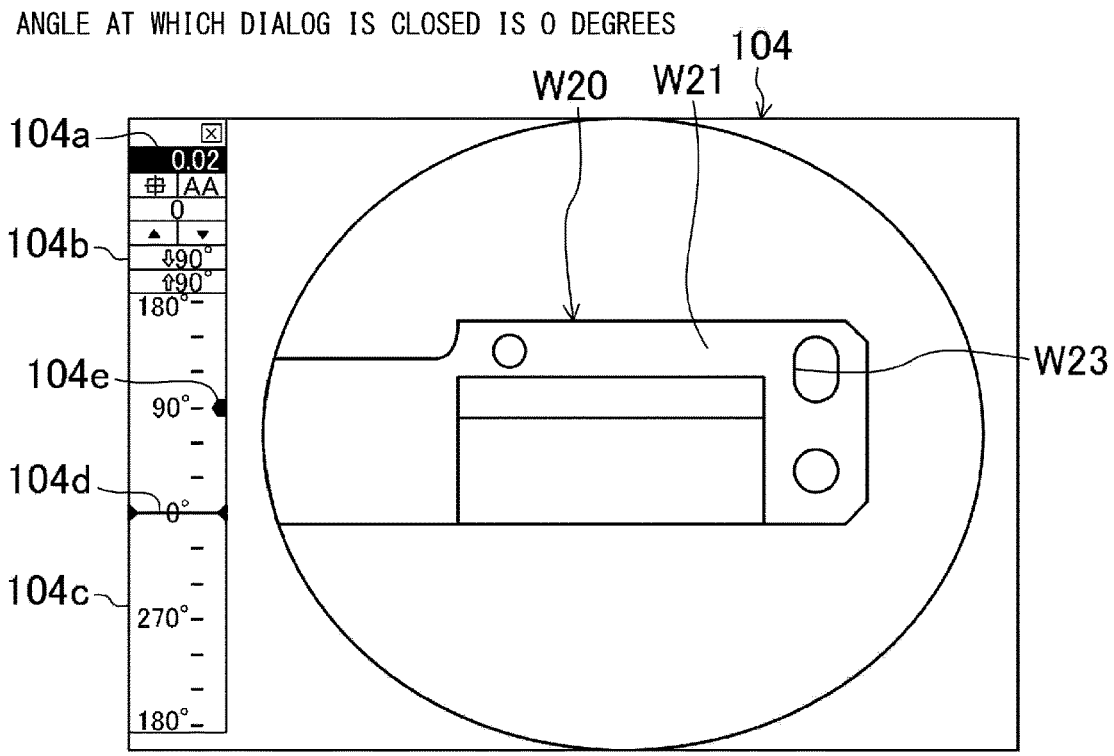
FIG. 26A is a view illustrating an example of a user interface image for displaying a measurement object image as a box article in a state where an angle at which a dialog is closed is 0 degrees.
Figure 26B:
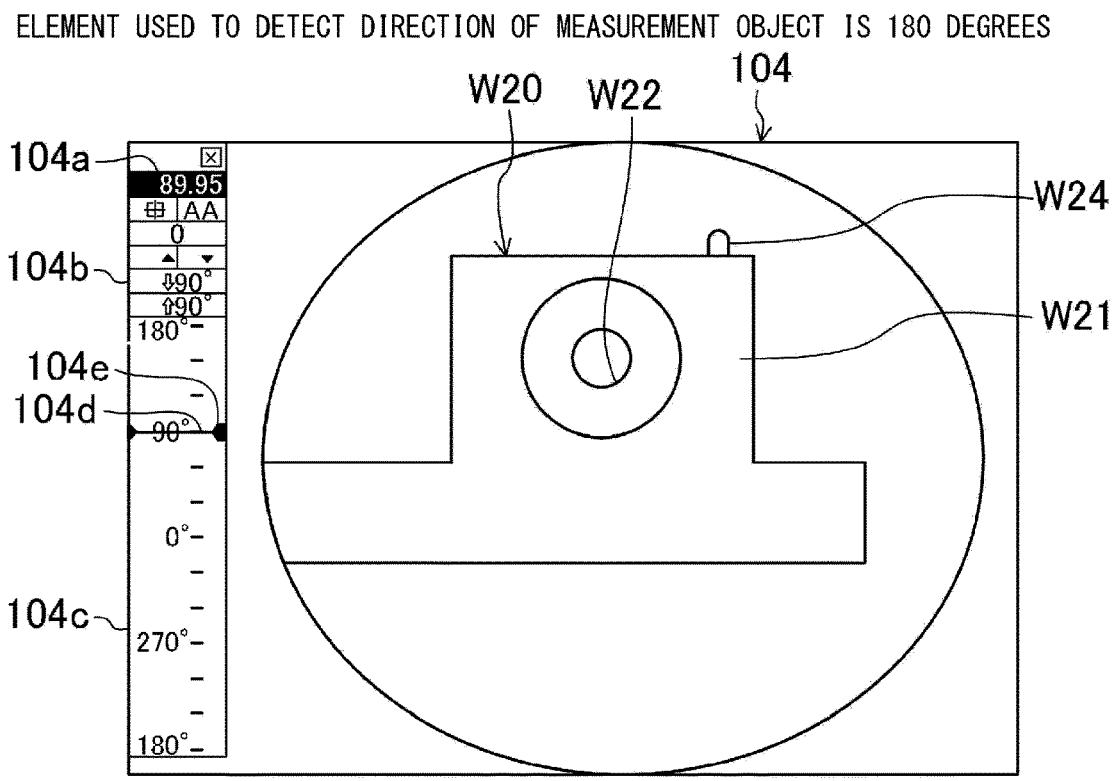
FIG. 26B is a view illustrating an example of a user interface image displaying the measurement object image as the box article in a state where an element used to detect a direction of the measurement object is rotated by 180 degrees.

FIG. 26A is the user interface image 104 displaying a measurement object image in a state where an angle at which a dialog is closed is 0 degrees. Further, FIG. 26B is the user interface image 104 displaying the measurement object image in a state where an element used to detect a direction of the measurement object W is rotated by 180 degrees. As described above, Step SA1 of the flowchart illustrated in FIG. 10A can be executed.

In Step SA2, a measurement element when the rotation angle is 0 degrees (measurement element on a front surface) and a measurement element when the rotation angle is 180 degrees (measurement element on a back surface) can be set individually in a state where a background image, which is the measurement object image, is displayed basically in the same manner as in the case of the shaft article. When the measurement element when the rotation angle is 0 degrees is set as a first measurement element and the measurement element when the rotation angle is 180 degrees is set as a second measurement element, a dimension between the first measurement element and second measurement element can be measured.

When a background image illustrated in FIG. 26A is used as a first measurement object image (front surface image), a background image illustrated in FIG. 26B is a second measurement object image (back surface image) obtained by capturing an image of the measurement object rotated by 180 degrees from the rotation angle at which the first measurement object image has been acquired. A first XY coordinate system (front-side coordinate system) and a second XY coordinate system (back-side coordinate system) can be set for the background image illustrated in FIG. 26A and the background image illustrated in FIG. 26B, respectively. The dimension between the first measurement element and the second measurement element can be measured by mutually converting the first XY coordinate system and the second XY coordinate system. Specifically, a matrix for mutually converting the first XY coordinate system and the second XY coordinate system may be obtained. For example, during the display of the back surface image, the measurement element on the front surface can be also displayed on the back surface image without deviation by converting the measurement element on the front surface with the above matrix, and can be also designated. During display of the front surface image, the same conversion may be performed on the measurement element on the back surface. As a result, it is possible to perform the measurement of the dimension between the measurement elements whose rotation angles are different by 180 degrees without deviation.

Further, it is also possible to mutually convert the first measurement object image and the second measurement object image to measure the dimension between the measurement element on the front surface and the measurement element on the back surface based on a contour of the measurement object W in the first measurement object image and a contour of the measurement object W in the second measurement object image.

A shape of the measurement element on the front surface and a shape of the measurement element on the back surface can be displayed on the display section 16 at the same time. In this case, the measurement element on the front surface and the measurement element on the back surface can be displayed in different display forms. Examples of the different display forms include to changing colors, line types, or the like between the measurement element on the front surface and the measurement element on the back surface.

(Continuous Measurement Mode)

The image dimension measurement device 1 can execute a continuous measurement mode after the measurement setting mode. The continuous measurement mode is started by the user operating an execution button of the continuous measurement mode. The continuous measurement mode is a mode of sequentially measuring a plurality of measurement objects W, and can also be referred to as a mode of operating the image dimension measurement device 1.

(Continuous Measurement of Shaft Article)

In the following description, the case of the measurement object W made of the shaft article will be described. A procedure in the continuous measurement mode will be described with reference to a flowchart illustrated in FIG. 27. In Step SB1 after start, a measurement setting is made. Specifically, when a plurality of settings are made in the above measurement setting mode and a plurality of setting contents are stored in the storage section 4, a setting file for continuous measurement among them is selected and executed.

Further, the measurement object W is mounted on the chuck mechanism 6. At the stage where the measurement object W is mounted on the chuck mechanism 6, the relationship between a mechanical angle (rotation angle defined by the image dimension measurement device 1) and a rotation angle of the measurement object W is indefinite. Further, there may occur an error in mounting the measurement object W on the chuck mechanism 6 between the measurement setting and the continuous measurement.

When Step SB1 ends, the processing proceeds to Step SB2. In Step SB2, a position and an orientation of the measurement object W are confirmed. At this time, a positioning guide 208 may be displayed to be superimposed on the measurement object image as illustrated by the broken line in FIG. 28A. As the positioning guide 208, for example, an image in which a pattern image is translucent can be used, or a contour line of the image can be used. Further, if there is an epi-illumination image captured at the same angle as the pattern image during the measurement setting, a combined image of the pattern image and the epi-illumination image can be displayed in a translucently superimposed manner. A frame line indicated by reference sign 209 in the drawing is an area of the pattern image.

Figure 28A:
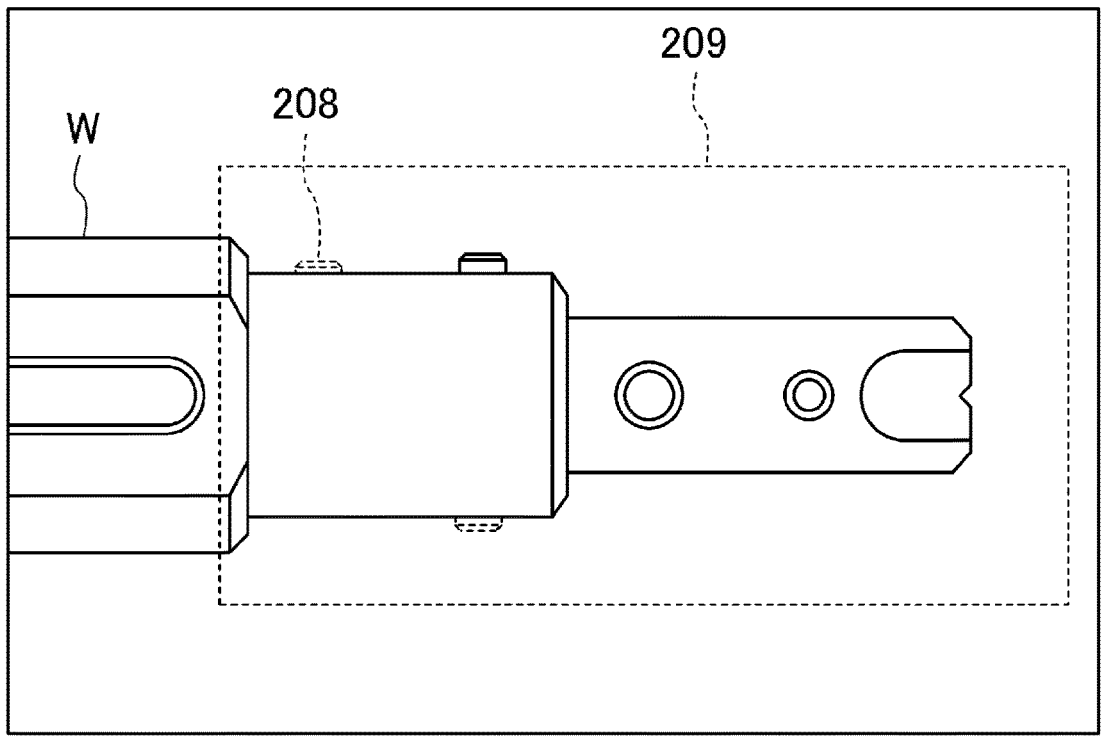
FIG. 28A is a view illustrating an image of a measurement object displaying a positioning guide.
Figure 28B:
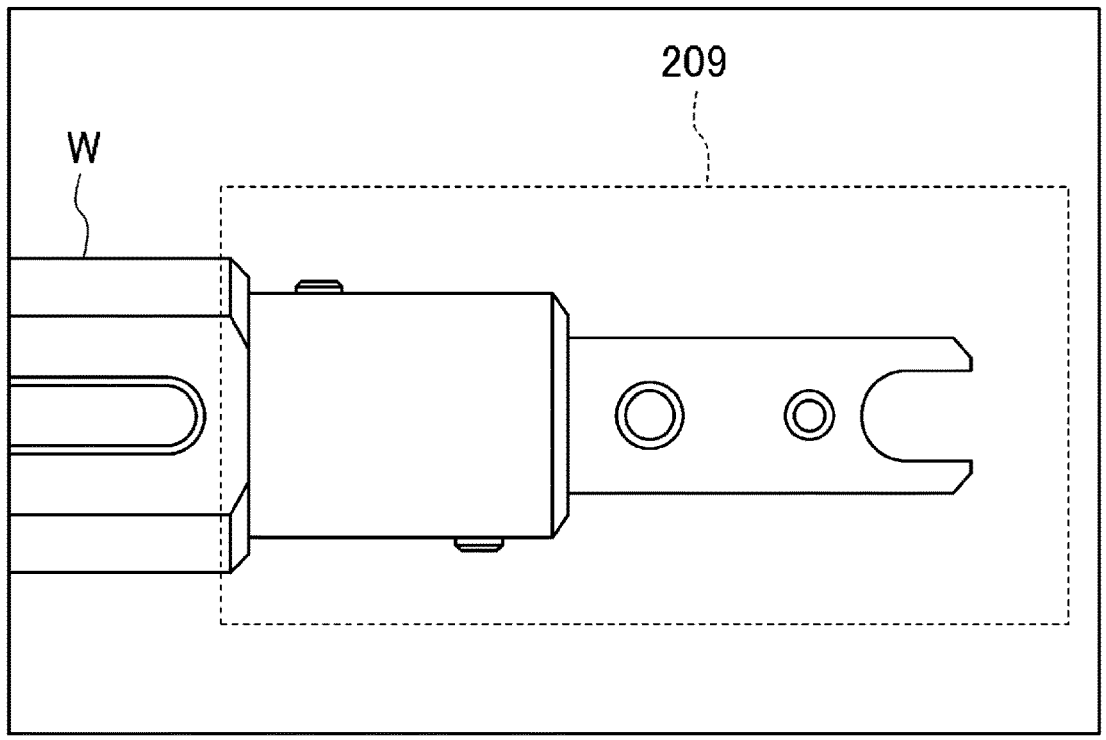
FIG. 28B is a view illustrating a state where a measurement object is aligned with a positioning guide.

The user can adjust a rotation angle of the measurement object W such that the positioning guide 208 and the measurement object W coincide with each other. The rotation angle of the measurement object W can be adjusted by rotating the manual adjustment knob 55. FIG. 28B illustrates a state where the adjustment of the rotation angle of the measurement object W is completed. Incidentally, it is unnecessary to adjust a direction of the measurement object W if the setting for rotating the measurement object W by 360 degrees is selected, at the time of registering the pattern image.

When Step SB2 ends, the processing proceeds to Step SB3, and the measurement in the measurement setting is automatically performed for the current measurement object W based on a condition set in the continuous measurement and each information held in the measurement setting. First, pattern search is executed in Step SB4. Specifically, the pattern search execution section 34 illustrated in FIG. 3 executes the pattern search to search for a pre-registered pattern image using the measurement object image captured by the imaging section 15. For example, the pattern search execution section 34 executes pattern search using a plurality of measurement object images obtained by capturing images of the measurement object at different rotation angles by the imaging section 15 and identifies a rotation angle at which the highest degree of coincidence with the registered pattern image is achieved. At this time, the rotation angle at which the highest degree of coincidence with the pattern image is achieved can be detected within a set angle range. This can be referred to as rotation pattern search since the measurement object W is rotated.

When the rotation pattern search ends, the processing proceeds to Step SB5. In Step SB5, the amount of deviation from the pattern image is detected in the measurement object image at the rotation angle identified in Step SB4. Thereafter, a position of a measurement element is corrected by the same amount as the detected deviation amount based on the detected deviation amount and position information. This corresponds to a position correction process.

When the position correction process ends, the processing proceeds to Step SB6. In Step SB6, the auto-angle function is executed. For example, a characteristic shape designated at the time of setting a reference angle in the measurement setting is used, and the direction of the measurement object W is detected by the auto-angle function. The measurement can be performed within a mechanical angle range around an angle obtained by the following formula.

Pattern search detection angle during continuous measurement+Auto-angle angle during measurement setting−Pattern image imaging angle during measurement setting When the detection of the direction of the measurement object W by the auto-angle function in Step SB6 ends, the processing proceeds to Step SB7 to calculate a reference angle and a measurement angle. For example, any degree in mechanical angle to which the reference angle during the continuous measurement corresponds based on the characteristic shape and an offset amount of the reference angle during the measurement setting. In other words, a reference rotation angle is identified, and the measurement angle to measure a measurement element is calculated based on a relative rotation angle (offset amount) with respect to the reference rotation angle stored in the storage section 4.

After calculating the measurement angle, the processing proceeds to Step SB8. In Step SB8, the control unit 3 controls the rotation unit 5 so as to have the measurement angle calculated in Step SB7. As a result, the rotation angle of the measurement object W becomes the measurement angle.

When the control of the rotation unit control ends, the processing proceeds to Step SB9 to measure the measurement element. In Step SB9, first, the imaging section 15 captures an image of the measurement object W to generate a measurement object image when the rotation unit 5 reaches the measurement angle. As a result, it is possible to measure the measurement element.

After generating the measurement object image, the edge extraction section 30 illustrated in FIG. 3 executes image processing on the measurement object image to extract an edge of the characteristic shape of the measurement object W. The edge information output from the edge extraction section 30 is input to the measurement section 31, and the measurement section 31 executes a measurement process of measuring a dimension of the measurement element based on the measurement object image.

Figure 29:
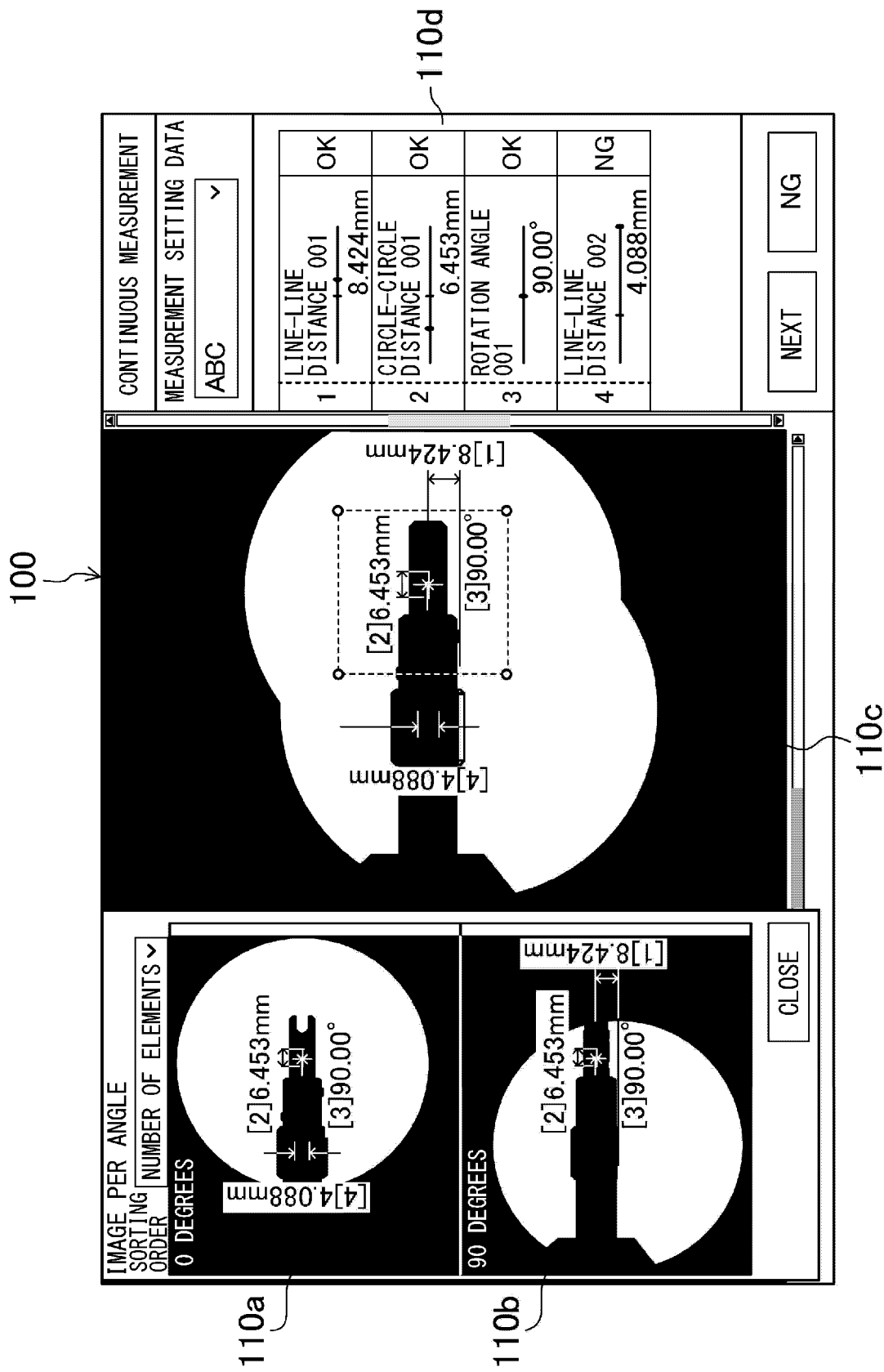
FIG. 29 is a view illustrating an example of a user interface image for displaying a measurement result.

When the measurement process ends, the processing proceeds to Step SB10 to execute a display process. In the display process, the UI generation section 32 generates a user interface image 110 for measurement result display as illustrated in FIG. 29, and the control unit 3 displays the user interface image 110 on the display section 16. The user interface image 110 is provided with a first image display area 110*a*, a second image display area 110*b*, a third image display area 110*c*, and a result display area 110*d*. It is possible to display a measurement object image when the rotation angle is 0 degrees in the first image display area 110*a* and to display a measurement object image when the rotation angle is 90 degrees in the second image display area 110*b*. That is, the measurement object images at different rotation angles can be displayed in the first image display area 110*a* and the second image display area 110*b*.

In the third image display area 110*c*, one or two or more measurement elements and dimension lines, measurement values, and the like of the respective measurement elements are displayed to be superimposed on the measurement object image. The third image display area 110*c* is set to be larger than the first image display area 110*a* and the second image display area 110*b*.

A name, a measurement value, and determination of each of the measurement elements are displayed in the result display area 110*d*. The determination indicates whether or not a measurement value is out of a preset range of values, and can be displayed as, for example, OK, NG, or the like. The displayed determination can include determination results of the respective measurement elements and an overall determination result that integrates these determination results.

(Measurement at Mechanical Angle)

Each time the measurement object W is attached to or detached from the chuck mechanism 6, a relative rotation angle between the measurement object W and the chuck mechanism 6 is different. Regarding this, a measurement error can be eliminated through the following step.

That is, the process in this step is effective when it is desired to measure a spot that can be measured only when the chuck mechanism 6 is at a specific angle. For example, when it is desired to measure the total length of the measurement object W, it is necessary to capture an image of an end surface of the measurement object W on the chuck mechanism 6 side, but the end surface of the measurement object W on the chuck mechanism 6 side is gripped by the chuck mechanism 6, and thus, is not captured that it is difficult to capture the image. However, the three chuck claws 61 to 63 are provided at intervals in the chuck mechanism 6 as illustrated in FIG. 5, and thus, the end surface of the measurement object W on the chuck mechanism 6 side is visible from the intervals among the chuck claws 61 to 63 depending on a rotation angle. When the imaging section 15 captures the image at such a rotation angle, the end surface of the measurement object W on the chuck mechanism 6 side can be captured and acquired as the image.

In order to realize this, a mechanism for designating an angle to be measured is provided by designating a machine angle at the time of measuring the measurement object W in the measurement setting. As a result, the measurement can be performed at the same mechanical angle regardless of the relative rotation angle between the measurement object W and the chuck mechanism 6. Specifically, it is configured such that the machine angle can be selected as a reference at the time of designating the rotation angle during the measurement setting, and this machine angle can be designated. Such an operation can be realized by the user operating the operation section 14.

Figure 30:
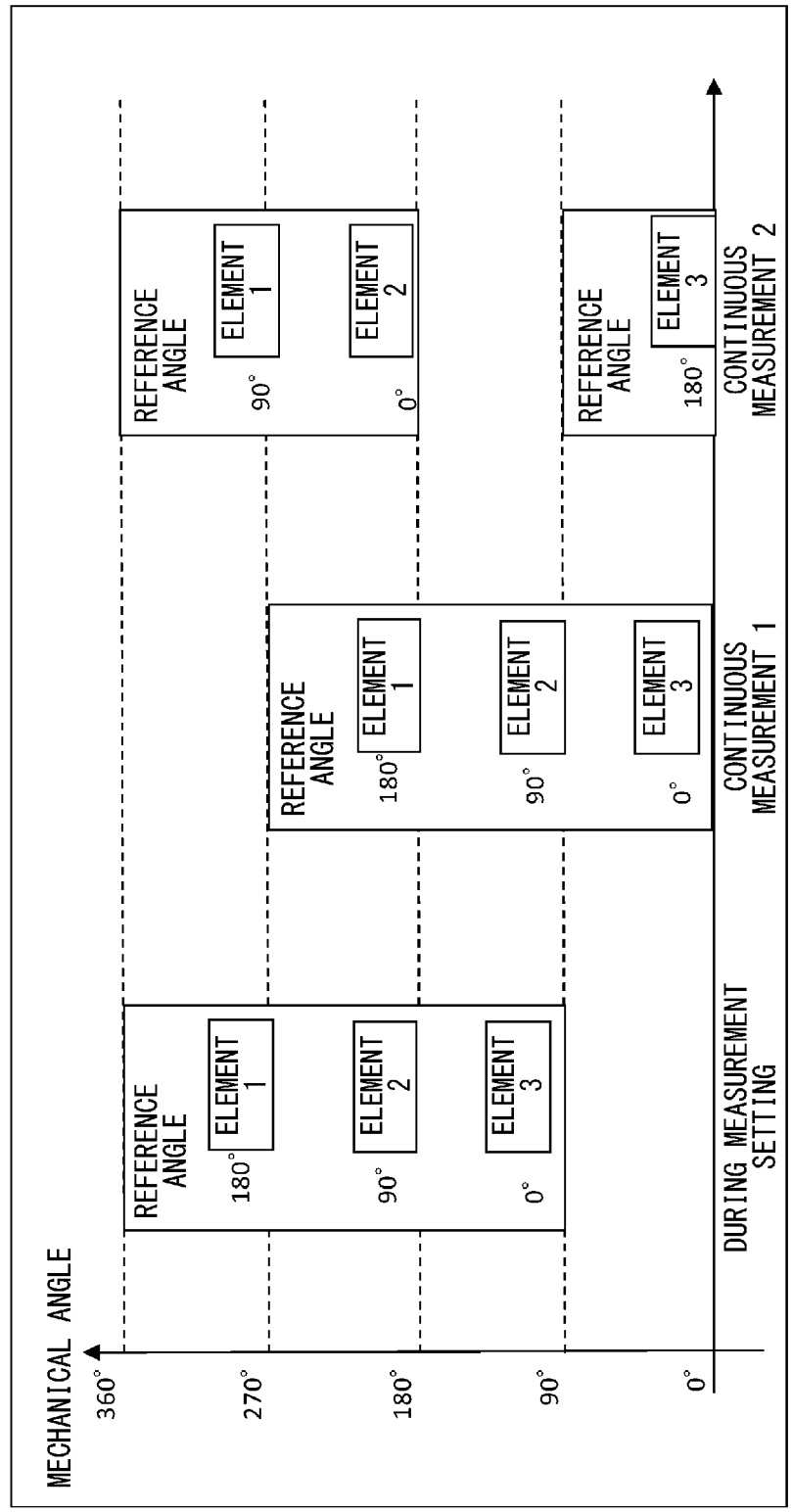
FIG. 30 is an explanatory view of a measurement angle in a setting that does not include a mechanical reference element.

FIG. 30 is an explanatory view of a measurement angle in a setting that does not include a mechanical reference element. Even if the relative rotation angle between the measurement object W and the chuck mechanism 6 is different between the measurement setting and the continuous measurement, a relative angle between the respective elements does not change only by a change of a difference between the reference angle and the mechanical angle.

Figure 31:
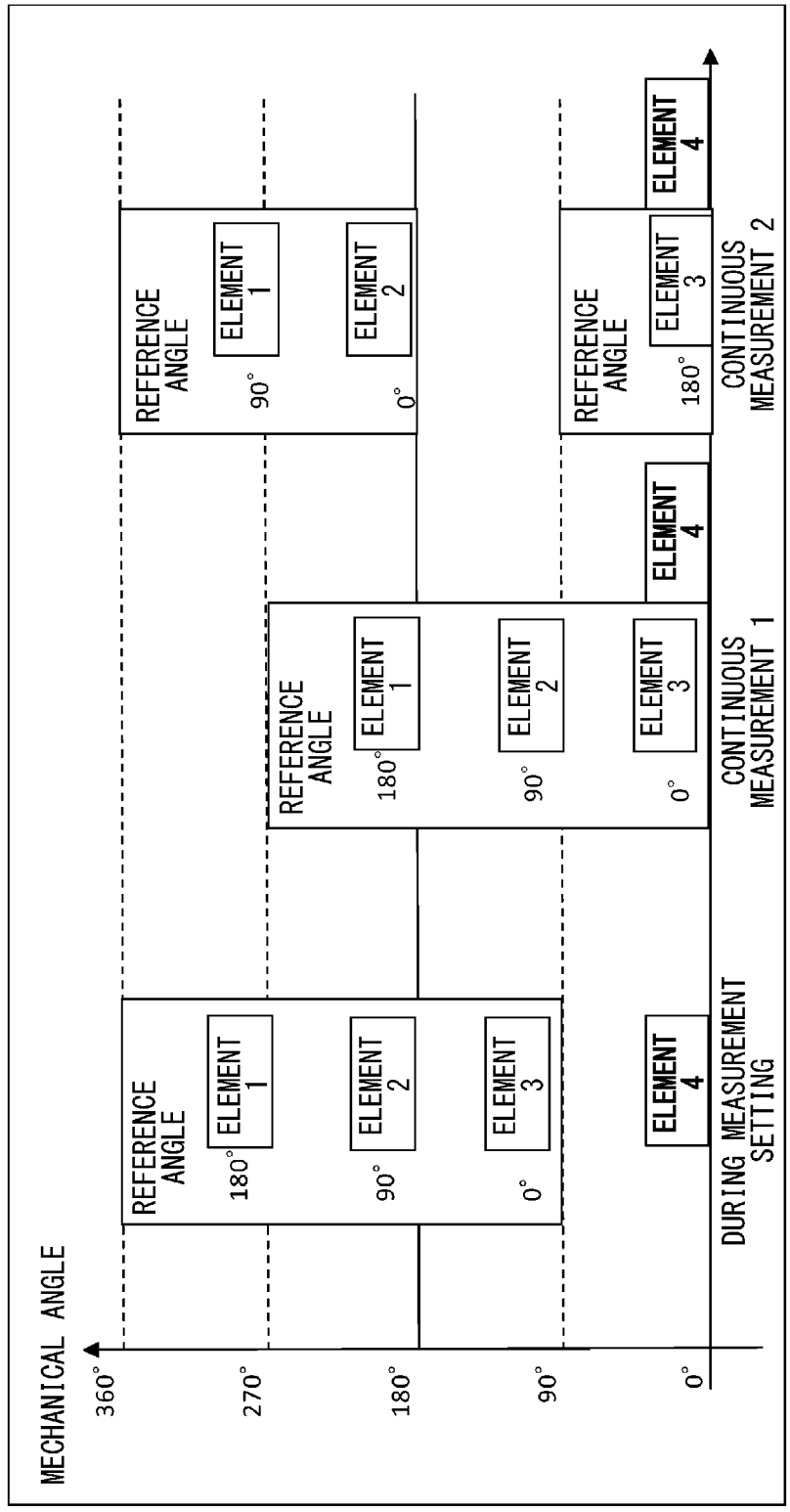
FIG. 31 is an explanatory view of a measurement angle in a setting that include the mechanical reference element.

On the other hand, FIG. 31 is an explanatory view of a measurement angle in a setting including the mechanical reference element. A case where Element 4 is designated with a machine angle of 0 degrees is illustrated. Even if the relative rotation angle between the measurement object W and the chuck mechanism 6 is different between the measurement setting and the continuous measurement, the relative angle between the respective elements does not change, only by the change of the difference between the reference angle and the mechanical angle, which is similar to the case illustrated in FIG. 30. However, an element designated with a machine angle can be measured at the same machine angle regardless of the reference angle.

(Continuous Measurement of Box Article)

A processing flow of a continuous measurement mode for the box article is basically the same as that of the continuous measurement mode for the shaft article. Hereinafter, parts different from the shaft article will be described in detail.

Figure 27:
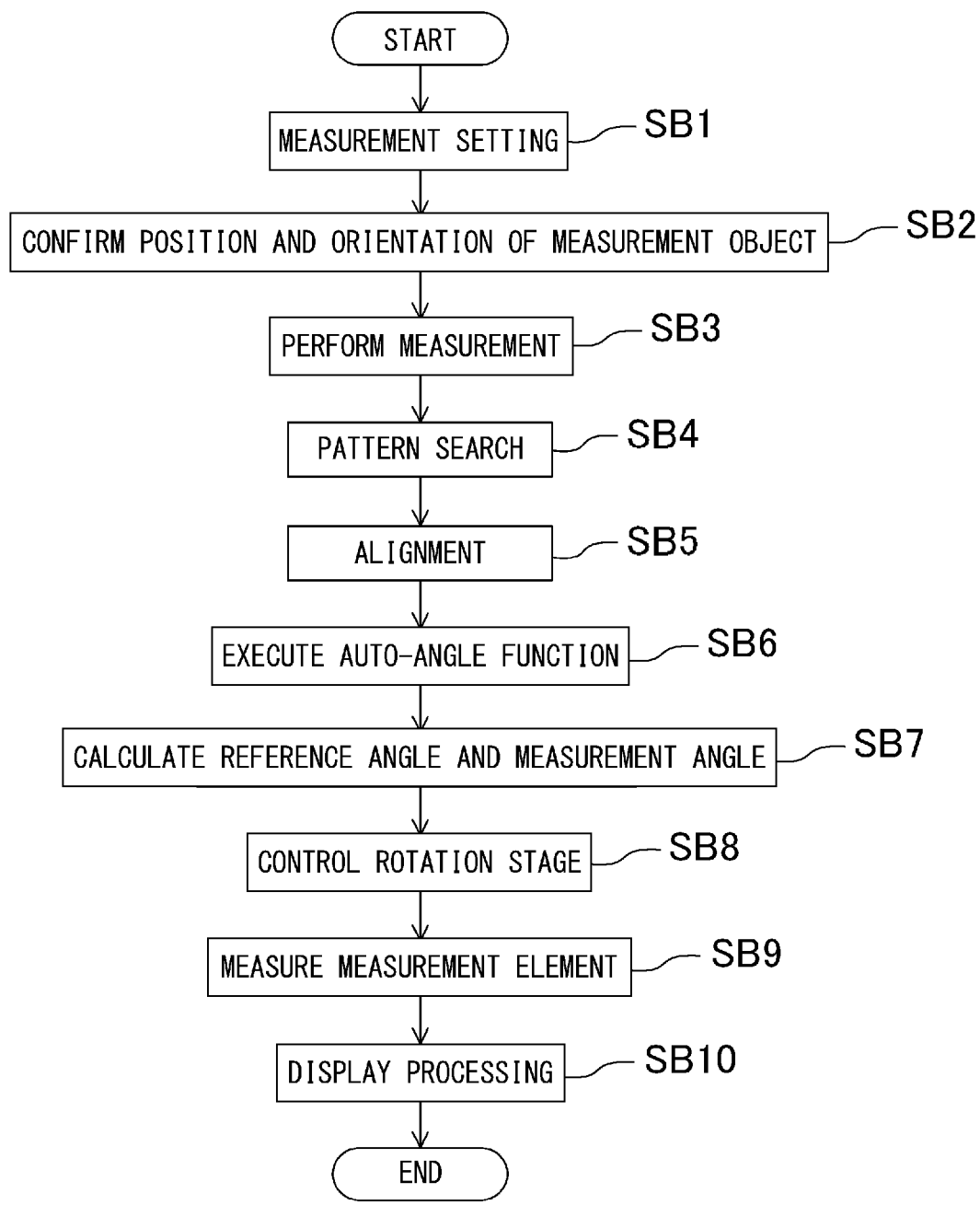
FIG. 27 is a flowchart illustrating an example of a procedure in a continuous measurement mode.

Even in the continuous measurement mode for the box article, the measurement setting is made in Step SB1 of the flowchart illustrated in FIG. 27, and a setting file for continuous measurement is selected at this time. At a stage when the measurement object W20 as the box article is mounted on the chuck mechanism 700 of the box article, a mechanical angle and an angle of the object W20 to be measured are indefinite, but a mounting angle often varies in units of 90 degrees at this time since the chuck mechanism 700 of the box article has two chuck claws, that is, the first and second chuck claws 601 and 602. Further, a mounting position and an inclination of the measurement object W20 may differ between the measurement setting and the continuous measurement.

Thereafter, in Step SB2, the user rotates the manual adjustment knob 55 to confirm whether the measurement object W20 can be mounted at the same position and angle in two or more directions, and adjusts an orientation of the measurement object W20 and the mounting position of the measurement object W20. At this time, a positioning guide as illustrated in FIG. 28A can be displayed to be superimposed on a measurement object image.

Next, the processing proceeds to Step SB5 after passing through Steps SB3 and SB4. In Step SB5, the alignment is performed by reflecting a result of pattern search. At this time, the amount of deviation corresponding to $\Delta\theta$ is corrected for a measurement element located at a rotation angle different from a rotation angle ($\theta$) when a pattern image has been captured. The amount of correction is set as $\Delta X$ in the X direction, $\Delta y^*\cos(\Delta\theta)$ in the Y direction, and $\Delta y^*\sin(\Delta\theta)$ in the Z direction. Steps SB6 to SB10 are the same as those in the case of the shaft article.

During the continuous measurement, not only a dimension between two measurement elements that differ in rotation angle by 180 degrees can be measured, but also a dimension between two measurement elements that differ in rotation angle by 90 degrees can be measured.

(Display Form)

In the user interface image 110 illustrated in FIG. 29, a measurement object image displayed in the first image display area 110*a* and a measurement object image displayed in the second image display area 110*b* are displayed up and down with positions in the left-right direction aligned. The following processes are sufficient for alignment of the left and right positions: for example, a horizontal virtual line that extends vertically on a screen is assumed, and a left end of the measurement object image displayed in the first image display area 110*a* and a left end of the measurement object image displayed in the second image display area 110*b* are located on the horizontal virtual line.

Further, the measurement object image displayed in the first image display area 110*a* and the measurement object image displayed in the second image display area 110*b* may be displayed side by side with positions in the up-down direction aligned although not illustrated. The following processes are sufficient for alignment of the upper and lower positions: for example, a vertical virtual line extending horizontally on the screen is assumed, and an upper end of the measurement object image displayed in the first image display area 110*a* and an upper end of the measurement object image displayed in the second image display area 110*b* are located on the vertical virtual line.

As described above, the rotation is made in units of 90 degrees in the case of the box article. Similarly, a design drawing serving as the basis of processing also describes dimensional instructions or tolerances for drawings as seen from a plurality of directions in units of 90 degrees. Thus, when the image in the first image display area 110*a* and the image in the second image display area 110*b* are displayed with the upper and lower ends or the left and right ends aligned, both the images can be displayed like the design drawing. As a result, a three-dimensional shape can be easily grasped, the correspondence between the respective drawings can be easily recognized, and further, the dimensional indications or tolerances instructed in the drawings can be easily compared.

The user can select one of the measurement object image displayed in the first image display area 110*a* and the measurement object image displayed in the second image display area 110*b*. The selection of the image by the user is received by the operation section 14. The control unit 3 controls the rotation unit 5 so as to have a rotation angle which is the same as the rotation angle of the measurement object W20 when the received measurement object image is captured. In other words, when one of the plurality of measurement object images is selected, the rotation angle of the measurement object W20 can be automatically set to the rotation angle at the time of capturing the image, and this function can be referred to as a navigation function.

The imaging section 15 captures the image of the measurement object W20 in a state where the rotation angle of the measurement object W20 is the same as the rotation angle of the measurement object W20 at the time of capturing the selected measurement object image to generate a preview image.

The preview image generated by the imaging section 15 is displayed in the third image display area 110c of the user interface image 110. The respective images are simultaneously displayed in the first image display area 110a, the second image display area 110b, and the third image display area 110c. Since the third image display area 110c is the largest, the preview image is displayed in the state of being enlarged as compared to the other images. As a result, it is easier to read a dimension line or a measurement value on the preview image.

The user interface image 110 may display images of three or more measurement objects having different rotation angles from each other. For example, it is possible to display images of three measurement objects having rotation angles of 90 degrees, 180 degrees, and 270 degrees. Even in this case, a measurement object image selected by the user can be enlarged and displayed as the preview image.

Figure 32:
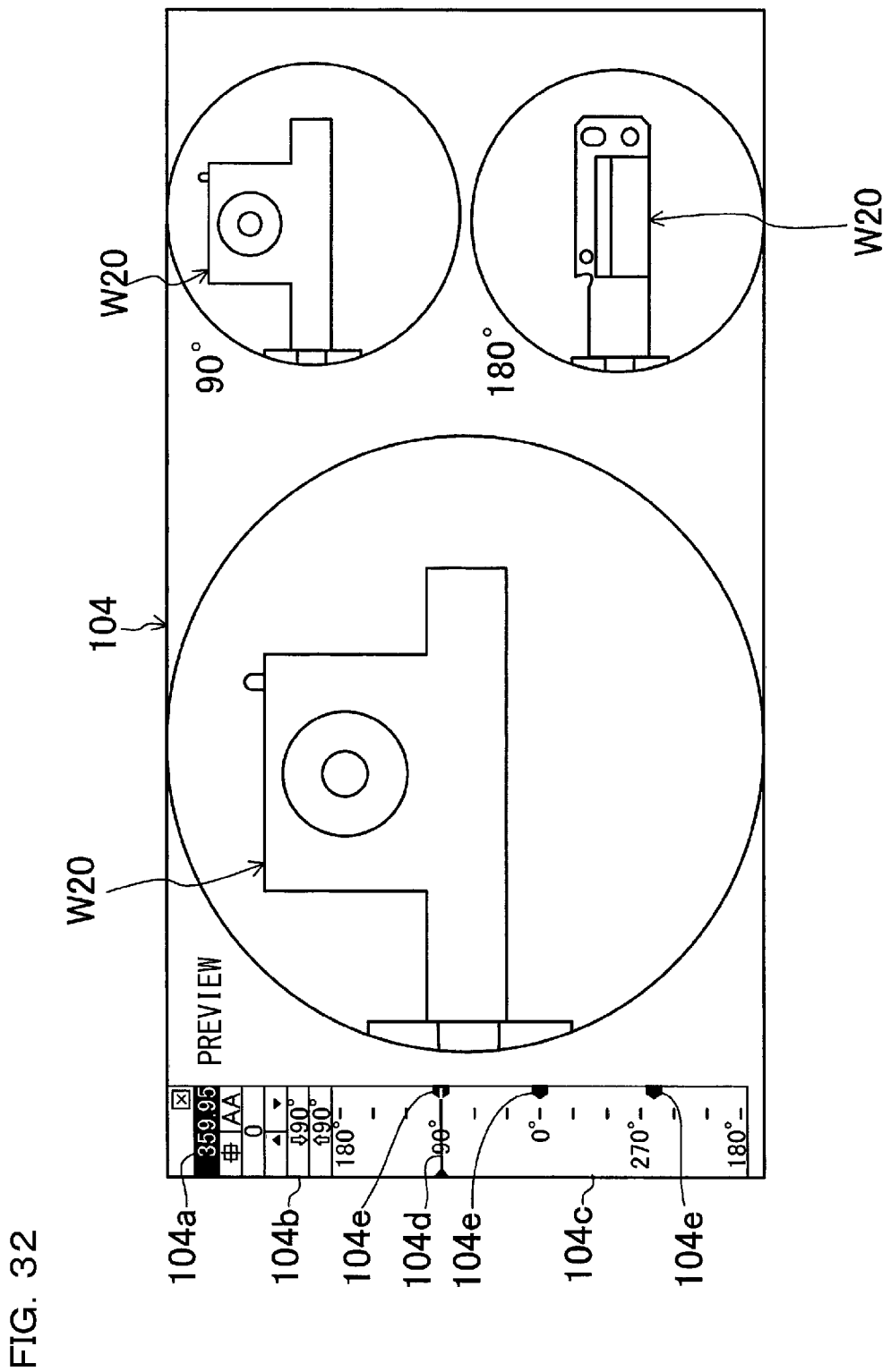
FIG. 32 is a view illustrating an example of a user interface image displayed on a display section when the measurement object is the box article.

FIG. 32 is a view illustrating an example of the user interface image 104 displayed on the display section 16 in the case of the measurement object W20 as the box article. In this example, a plurality of images are displayed on the right side of the user interface image 104. Specifically, two or more measurement object images having different rotation angles can be displayed, and, for example, two images or three images obtained by making the rotation in units of 90 degrees can be displayed. The user can select any image to be displayed. As a result, a display form corresponds to the design drawing serving as the basis of processing is achieved.

Meanwhile, a preview image is displayed on the left side of the user interface image 104 in FIG. 32. The preview image is an enlarged image of an image selected by the user from among the measurement object images on the right side. In this example, the measurement object image captured at 90 degrees is enlarged and displayed as the preview image. A measurement result can be displayed on the preview image.

Functions and Effects of Embodiment

As described above, according to the present embodiment, the user can input a characteristic shape as information related to a measurement reference on a measurement object image at the time of measurement setting, and further can set a measurement element such as a line segment, a circle, and an arc, on a measurement object image generated at a different rotation angle. The storage section 4 can store a relative rotation angle when the measurement object image in which the measurement element has been set is captured with respect to a reference rotation angle when the measurement object image with the input of the characteristic shape is captured.

Then, at the time of continuous measurement, the imaging section 15 generates a plurality of measurement object images in which the measurement object W is captured at different rotation angles. The control unit 3 can identify the reference rotation angle based on the characteristic shape received by the operation section 14 from among the plurality of measurement object images. The relative rotation angle with respect to the reference rotation angle can be read from the storage section 4. When a measurement angle to measure the measurement element is calculated based on the relative rotation angle, the control unit 3 controls the rotation unit 5 so as to have the calculated measurement angle. As a result, the rotation angle of the rotation unit 5 automatically becomes the measurement angle, so that the measurement element is arranged at a position where the imaging section 15 can capture an image. Therefore, the user does not need to adjust the rotation angle of the measurement object W with respect to the imaging section 15.

Further, the measurement object W20 as the box article can be rotated in units of 90 degrees, it becomes possible for the imaging section 15 to capture the images of the respective four side surfaces of the rectangular parallelepiped. When one side surface of the measurement object W20 is captured in a measurement object image with a rotation angle of 0 degrees, a first measurement element can be set on the measurement object image. Further, when another side surface of the measurement object W20 is captured in a measurement object image with a rotation angle of 90 degrees or 180 degrees, a second measurement element can be set on the measurement object image. The control unit 3 can measure a dimension between the first measurement element and the second measurement element existing on two different surfaces.

Further, a rotation angle at which a characteristic shape faces the imaging section 15 can be calculated based on the characteristic shape and a change in the shape on the measurement object image by designating the characteristic shape of the measurement object W. As a result, the characteristic shape of the measurement object W can be made to face the imaging section 15, and thus, the dependency on individual skill is eliminated, adjustment has no fluctuation, and the adjustment can be performed in a short time.

The above-described embodiments are merely examples in all respects, and should not be construed as limiting. Further, all modifications and changes belonging to the equivalent range of the claims fall within the scope of the present aspect.

As described above, the image dimension measurement device according to the invention can be applied to those provided with a rotation mechanism that rotates a measurement object.

What is claimed is:

1. An image dimension measurement device, which measures a dimension of a measurement object, comprising:
   a rotation mechanism that rotates the measurement object about a predetermined axis;
   a camera that has an optical axis intersecting a rotation axis of the rotation mechanism and is configured to generate a plurality of measurement object images obtained by capturing images of the measurement object at different rotation angles;
   an operation section configured to receive setting of a reference shape on a first measurement object image generated by the camera and setting of a measurement element on a second measurement object image captured at a different rotation angle from the first measurement object image;
   a storage that stores a relative rotation angle when the second measurement object image is captured with respect to a reference rotation angle when the first measurement object image is captured; and
   a controller that identifies the reference rotation angle from the plurality of measurement object images based on the setting of the reference shape received by the operation section during measurement, calculates a measurement angle to measure the measurement element set by the operation section based on the relative rotation angle with respect to the reference rotation angle stored in the storage, controls the rotation mechanism such that a rotation angle of the rotation mechanism becomes the measurement angle, and executes a measurement process of measuring the dimension of the measurement element set by the operation section based on a measurement object image captured by the camera when the rotation angle of the rotation mechanism becomes the measurement angle.

2. The image dimension measurement device according to claim 1, wherein the controller calculates a rotation angle at which the reference shape faces the camera based on the plurality of measurement object images captured by the camera and a rotation angle of the rotation mechanism when each of the measurement object images is captured, and controls the rotation mechanism such that the reference shape faces the camera.

3. The image dimension measurement device according to claim 1, further comprising
a display that displays each of rotation angles and the second measurement object image captured at each of the rotation angles in association with each other, and an angle corresponding to the second measurement object image on which the measurement element is set in an identifiable manner,
wherein the operation section is configured to be capable of performing an operation of selecting a rotation angle on the display section, and
the controller controls the rotation mechanism to have the rotation angle selected by the operation section.

4. The image dimension measurement device according to claim 1, wherein
the operation section is configured to be capable of registering a pattern image of an arbitrary part of the measurement object on a measurement object image and position information of the pattern image, and
the controller includes a pattern search execution section that executes pattern search to search for the pattern image registered by the operation section using the measurement object image captured by the camera during measurement, and executes position correction of the measurement object image in an X direction and a Y direction based on an execution result of the pattern search in the pattern search execution section and the position information registered in the operation section.

5. The image dimension measurement device according to claim 4, wherein
the controller executes the pattern search using a plurality of measurement object images obtained by capturing images of the measurement object at different rotation angles by the camera during measurement, and identifies a rotation angle at which a highest degree of coincidence with the registered pattern image is obtained, and
the controller uses the rotation angle identified by the pattern search execution section as a reference angle.

6. The image dimension measurement device according to claim 5, wherein the operation section is configured to be capable of setting a search angle range in which the pattern search execution section executes the pattern search.

7. The image dimension measurement device according to claim 5, wherein the operation section is configured to be capable of receiving designation of an area to be registered in the pattern image on the measurement object image.

* * * * *